US008676238B2

(12) United States Patent
Marcellino et al.

(10) Patent No.: US 8,676,238 B2
(45) Date of Patent: *Mar. 18, 2014

(54) MANAGING NOTIFICATION MESSAGES

(71) Applicant: Apple Inc., Cupertino, CA (US)

(72) Inventors: Christopher Marcellino, San Francisco, CA (US); Justin Edward Santamaria, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,012

(22) Filed: Jan. 18, 2013

(65) Prior Publication Data

US 2013/0130730 A1 May 23, 2013

Related U.S. Application Data

(63) Continuation of application No. 12/392,679, filed on Feb. 25, 2009, now Pat. No. 8,364,123.

(51) Int. Cl.
*H04W 68/00* (2009.01)

(52) U.S. Cl.
USPC .......................................................... 455/466

(58) Field of Classification Search
None
See application file for complete search history.

(56) References Cited

U.S. PATENT DOCUMENTS

| | | | |
|---|---|---|---|
| 5,410,543 A | 4/1995 | Seitz et al. | |
| 6,424,354 B1 | 7/2002 | Matheny et al. | |
| 6,512,930 B2 | 1/2003 | Sandegren | |
| 7,142,848 B2 | 11/2006 | Owen et al. | |
| 7,155,243 B2 | 12/2006 | Baldwin et al. | |
| 7,437,409 B2 | 10/2008 | Danieli | |
| 7,499,995 B2 | 3/2009 | Armstrong | |
| 7,660,865 B2 | 2/2010 | Hulten et al. | |
| 8,113,991 B2 * | 2/2012 | Kutliroff | 482/8 |
| 8,292,806 B2 * | 10/2012 | Shimada et al. | 600/301 |
| 2003/0061365 A1 | 3/2003 | White et al. | |
| 2007/0006305 A1 | 1/2007 | Florencio et al. | |
| 2008/0039008 A1 | 2/2008 | Chen et al. | |
| 2008/0086555 A1 | 4/2008 | Feinleib | |

(Continued)

FOREIGN PATENT DOCUMENTS

WO  WO 2004/043098 A1  5/2004

OTHER PUBLICATIONS

David Chartier,"Lots to Like About New iPhone 2.2 Software Update", Tech Policy Summit, Published Nov. 21, 2008, 5 pages.

(Continued)

*Primary Examiner* — Melody Mehrpour
(74) *Attorney, Agent, or Firm* — Park, Vaughan, Fleming & Dowler LLP

(57) ABSTRACT

Mobile devices each maintain a whitelist of application identifiers corresponding to applications that the user(s) of that mobile device wants to receive notification messages for and a blacklist of application identifiers corresponding to applications that the user(s) of the mobile device does not want to receive notification messages for. Each mobile device transmits its representations of the whitelist and blacklist to a certain one of a plurality of couriers that controls transmission of notification messages for that mobile device. Each notification message includes a mobile device identifier and an application identifier. Each courier processes a given notification message for a mobile device (e.g., deliver to that mobile device, drop, report as uninstalled to the sender) based on the application identifier included in the mobile device and the representations of the whitelist and blacklist for that mobile device.

23 Claims, 13 Drawing Sheets

(56) References Cited

U.S. PATENT DOCUMENTS

| | | |
|---|---|---|
| 2009/0204666 A1 | 8/2009 | Sana et al. |
| 2009/0245176 A1 | 10/2009 | Balasubramanian et al. |
| 2009/0298470 A1 | 12/2009 | Huber et al. |
| 2010/0138501 A1 | 6/2010 | Clinton et al. |
| 2010/0216434 A1 | 8/2010 | Marcellino et al. |
| 2011/0078311 A1* | 3/2011 | Nakashima ............... 709/225 |
| 2011/0258434 A1* | 10/2011 | Qiu et al. .................. 713/153 |
| 2011/0258454 A1* | 10/2011 | Qiu et al. .................. 713/176 |
| 2012/0003958 A1* | 1/2012 | Hossain et al. ............ 455/411 |
| 2013/0097660 A1* | 4/2013 | Das et al. .................. 726/1 |

OTHER PUBLICATIONS

PCT International Search Report and Written Opinion for PCT Application # PCT/US2012/048801, Mailing Date Mar. 25, 2013 (12 pages).

* cited by examiner

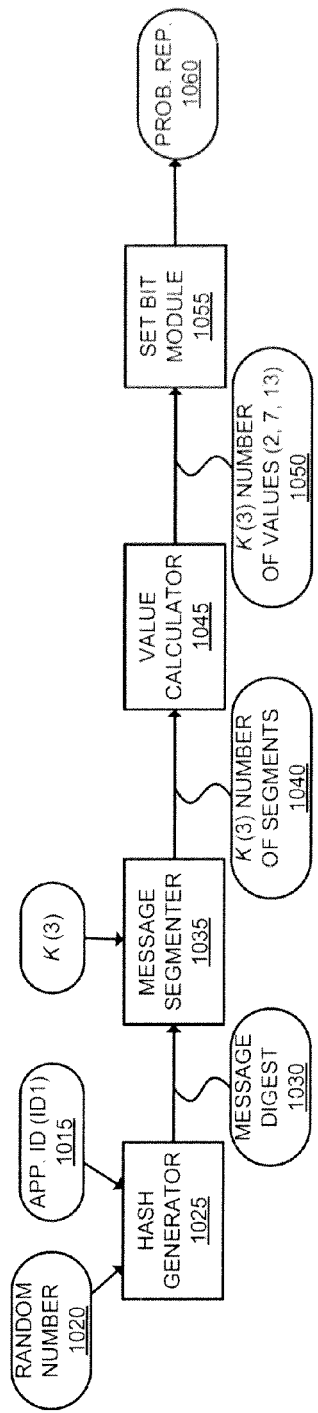

MANAGING NOTIFICATION MESSAGES

This application is a continuation of co-pending U.S. application Ser. No. 12/392,679 filed on Feb. 25, 2009.

BACKGROUND

1. Field

Embodiments of the invention relate to the field of mobile device processing; and more specifically, to the management of notification messages.

2. Background

Users of mobile devices (e.g., laptops, palmtops, mobile phones, smartphones, multimedia phones, portable media players, GPS units, mobile gaming systems, etc.) may have applications installed that periodically receive notification messages from notification services. For example, such applications include "push" email services (e.g., MobileMe, Microsoft Exchange ActiveSync, push-IMAP, Yahoo! Push, etc.) or other push services (e.g., update/upgrade services, news services, weblog services, podcast services, social networking services, or other types of services where notification messages may be sent.). Notification messages typically represent events of interest which are typically defined by the applications (e.g., new email indicator, new news item indicator, new podcast indicator, change of online status of a social networking friend, etc.).

In order to conserve battery life, mobile devices may enter into a reduced power mode when not connected to a constant power supply and not actively being used (e.g., an idle state). This is typically referred to as "sleep" mode. The sleep mode of particular mobile devices may be different depending on the characteristics of the mobile device. For example, in the case where the mobile device has network access, (e.g., cellular access, WiFi access, etc.), sleep mode may include temporally putting the main processor to sleep and turning off the display, yet keeping the radio stack in an operable function. Thus, while in sleep mode, these mobile devices may continue to receive notification messages for their installed applications. Upon receipt of notification messages, these mobile devices are awakened to process those notification messages.

BRIEF DESCRIPTION OF THE DRAWINGS

The invention may best be understood by referring to the following description and accompanying drawings that are used to illustrate embodiments of the invention. In the drawings:

FIG. 10A illustrates a probabilistic representation of a notification message preference list with all bits clear according to one embodiment of the invention;

FIG. 10B illustrates generating a probabilistic representation of a notification message preference list based on an application identifier and a random number according to one embodiment of the invention;

DETAILED DESCRIPTION

Figure 1:
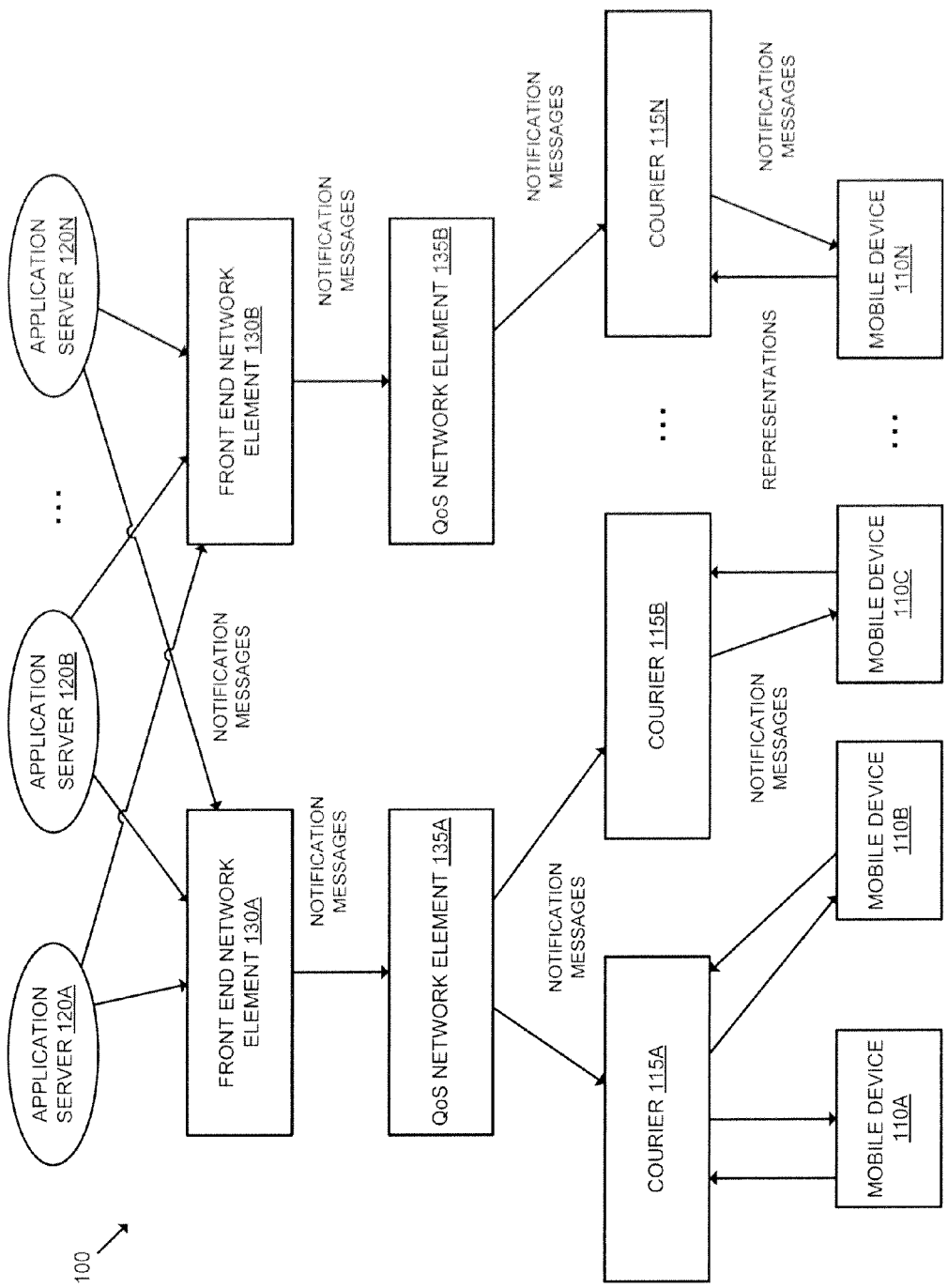
FIG. 1 illustrates an exemplary network used in one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation, References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more computing devices (e.g., mobile devices (e.g.. laptops, palm-tops, portable media players, smartphones, multimedia mobile phones, mobile gaming systems, etc.), couriers, etc.). Such computing devices store and communicate (internally and with other computing devices over a network) code and data using machine-readable media, such as machine-readable storage media (e.g., magnetic disks; optical disks; random access memory; read only memory; flash memory devices: phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

A method and apparatus for managing notification messages is described. In one embodiment of the invention, each mobile device maintains a whitelist of application identifiers corresponding to installed applications that the user of the mobile device wants to receive notification messages for, and maintains a blacklist of application identifiers corresponding to installed applications that the user does not want to receive notification messages for, In one embodiment of the invention, a mobile device transmits a representation of the whitelist and the blacklist to a courier it currently has a connection with and that courier stores the representations (the representations including uncompressed application identifiers of the whitelist and blacklist). Responsive to that courier receiving a notification message for that mobile device, which includes an application identifier, the courier determines whether that application identifier is on the representation of the whitelist or the representation of the blacklist. If the application identifier is on the whitelist representation, the courier delivers the notification message to the mobile device. If the application identifier is not on the whitelist representation but is on the blacklist representation, the courier will not deliver the notification message (e.g., it drops the notification message). If the application identifier is not on the representation of the whitelist and is not on the on the representation of the blacklist, then the courier reports to the sender of the notification message that the application corresponding with the application identifier is not installed on the mobile device.

In one embodiment of the invention, a compacted representation of the whitelist and a compacted representation of the blacklist are generated and transmitted to the courier(s) coupled to each mobile device. Responsive to those couriers receiving notification messages from application services, each notification message is parsed to determine the application identifier and mobile device the notification message belongs. If the application identifier is represented on the compacted representation of the whitelist for that mobile device, the courier will deliver the notification message to that mobile device. If the application identifier is not represented on the compacted representation of the whitelist but is represented on the compacted representation of the blacklist, then the courier will not deliver the notification message. If the application identifier is not represented on either the compacted representation of the whitelist or the compacted representation of the blacklist, then the courier reports to the sender of the notification message that the application corresponding with the application identifier is not installed on the mobile device.

FIG. 1 illustrates an exemplary network 100 which is used in some embodiments of the invention. The network 100 includes multiple application servers 120A-120N, each of which corresponding to a different application that transmits notification messages. For example, the application server 120A may be providing a social networking application (and correspondingly transmitting notification messages for that social networking application), the application server 120B may be providing an email application (and correspondingly transmitting notification messages for that email application), etc. Of course other types of applications may transmit notification messages (e.g., news applications, blog applications, anti-virus applications, applications to update the software on the mobile devices, music applications, gaming applications, etc.).

Each notification message includes, among other things, an application identifier that is unique across all the applications that can be installed on the mobile devices 110A-110N and a mobile device identifier which uniquely identifies one of the mobile devices 110A-110N.

Each of the application servers 120A-120N are coupled with the front end network elements 130A and 130B. The application servers 120A-120N register with the front end network element 130A and 130B. The front end network elements BOA and 130B perform functions such as validating permissions of the application servers 120A-120N. The number of front end network elements is exemplary and a different number of front end network elements may be included in the network 100. In addition, different ones of the application servers 120A-120N be only coupled with some of the front end network elements.

The front end network elements 130A and 130B are coupled with the QoS (Quality of Service) network elements 135A and 135B respectively. The QoS network elements 135A and 135B perform QoS services (e.g., traffic shaping, rate limiting, etc.), The couriers 115A-115N are network devices that are coupled with the QoS network elements 135A-135B and different ones of the mobile devices 110A-110N The couriers 115A-115N receive notification messages from the application servers 120A-120N that are for different ones of the mobile devices 110A-110N. The couriers 115A-115N, among other things, act as gateways for those notification messages. In other words, different ones the couriers 115A-

155N determine whether to forward those notification messages to different ones the mobile devices 110A-110N.

The mobile devices 110A-110N are coupled with different ones of the couriers 115A-115N (typically depending on the geographic location of those mobile devices in relation to those couriers). The mobile devices 110A-110N may As illustrated in FIG. 1, the courier 115A is coupled with the mobile devices 110A and 110B, the courier 115B is coupled with the mobile device 110C, and the courier 115N is coupled with the mobile device 110N. The mobile devices 110A-110N are coupled to the couriers 115A-115N over the Internet, Some of the mobile devices 110A-110N may connect to the Internet via a WiFi connection and/or a cellular connection, while others of the mobile devices 110A-110N may connect to the Internet only with a WiFi connection, or only with a cellular connection, In order to conserve battery life, each of the mobile devices 110A-110N may enter into sleep mode when not actively being used (e.g., an idle state). In order to reduce the number of times each mobile device is awakened from sleep mode, the mobile devices 110A-110N instruct the couriers 115A-115N not to send notification messages for certain ones of their installed applications. For example, battery life may be wasted if the mobile devices 110A-110N are wakened from sleep mode to process notification messages for applications that have been disabled or have a preference not to receive notification messages. For example, each of the mobile devices 110A-110N maintains a whitelist of installed applications that may receive notification messages (the whitelist including the application identifiers of those applications) and a blacklist of installed applications whose notification messages are not desired (the blacklist including the application identifiers of those applications). The blacklist includes those application identifiers that correspond with disabled applications and/or those application identifiers that correspond with applications that are associated with a preference to not receive notification messages. A disabled application is an application that does not execute unless enabled by the user (e.g., the application does not appear as an icon on an application launching portal of the mobile device unless enabled).

In order for the couriers 115A-115N to determine which notification messages to forward to the mobile devices 110A-110N, the courier devices 115A-115N need to know which applications may receive notification messages for each of the mobile devices.

According to one embodiment of the invention, each of the mobile devices 110A-110N may send a representation (e.g., list) of uncompressed application identifiers corresponding to applications that may receive notification messages (whitelist) and a representation (e.g., list) of uncompressed application identifiers corresponding to applications that may not receive notification messages (blacklist) to the courier(s) they are currently coupled with (e.g., the mobile devices 110A and 110B may send their representations of the whitelist and blacklist to the courier 115A, the mobile device 110C may send its representations of the whitelist and blacklist to the courier 115B, and the mobile device 110N may send its representations of the whitelist and blacklist to the courier 115N). Each application identifier is typically a string characters in either UTF-8 or UTF-16 format (8 or 16 bit Unicode Transformation Formal respectively).

In this embodiment of the invention, each notification message received by a given courier is parsed to determine the application identifier included in the notification message and the mobile device the message is for. The application identifier is compared with the representation of the whitelist for that mobile device. If the application identifier is on the representation of the whitelist, then the courier delivers the notification message to that mobile device. If the application identifier is not on the representation of the whitelist, the courier next checks to see if the application identifier is on the representation of the blacklist. If the application identifier is on the representation of the blacklist, then the courier does not transmit the notification message to the mobile device (it drops the message). If the application identifier is nut on either representation (whitelist or blacklist), then the courier reports to the sender of the notification message that the application is not installed on that mobile device. Thus, the couriers will not deliver notification messages to the mobile devices (which may potentially wake the device) for those applications that are represented on the blacklist.

While this embodiment is effective in reducing the amount of times the device needs to be awakened and the reduction of unwanted notification messages being received at the mobile devices, the size of the representation of the whitelist and the blacklist may be large (since the representation includes uncompressed application identifiers). As the number of installed applications increase, the size of the representations of the whitelist and/or blacklist also increases. Since each the mobile devices 110A-110N transmit their representations of the whitelist and the blacklist to different ones of the couriers 115A-115N, the size of the transmission may be substantial.

In another embodiment of the invention, the mobile devices 110A-110N each create a compacted representation (e.g., a compressed whitelist and blacklist using lossless compression algorithms (e.g., ZIP, run-length encoding, LZW, or other lossless compression algorithms), a probabilistic representation of the whitelist and a probabilistic representation of the blacklist (e.g., a Bloom filter for the whitelist and a Bloom filter for the blacklist)) of their whitelist and blacklist and transmits those compacted representations to one or more of the couriers 115A-115N. The couriers 115A-115N then use those compacted representations of the whitelist and the blacklist when determining how to process the notification messages it receives from the application servers 120A-120N (e.g., whether to deliver a notification message, whether to drop a notification message, or whether to report an uninstalled application to an application server), which will be described in greater detail later herein.

For example, if the compacted representations are compressed whitelists and blacklists, the couriers 115A-115N decompress the whitelist and blacklist and store the whitelist and blacklist and determine how to process incoming notification messages based on the whitelist and the blacklist. Alternatively, the couriers 115A-115N may decompress the whitelist and blacklist on the fly as they are processing the notification messages.

Figure 2:
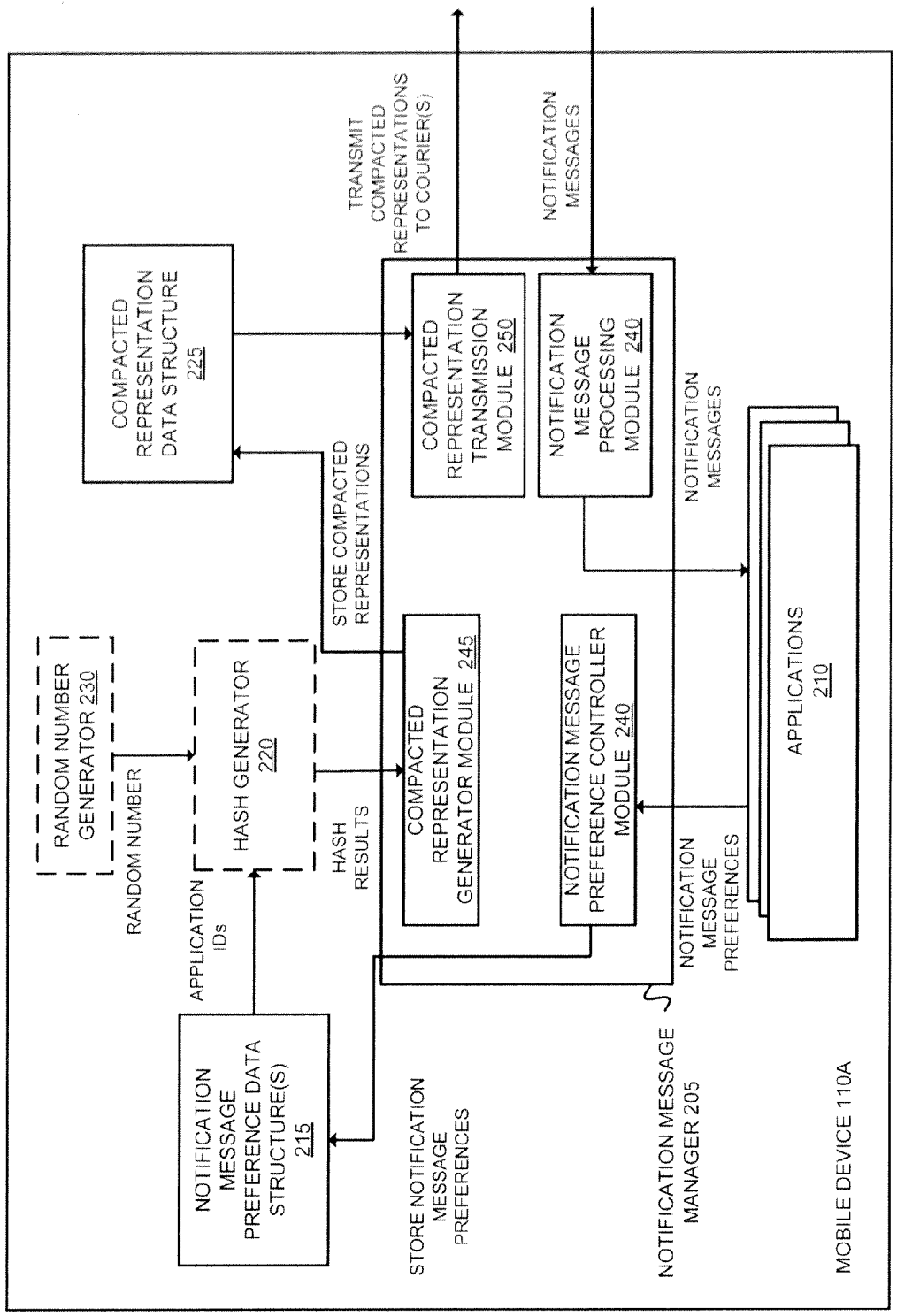
FIG. 2 illustrates an exemplary mobile device according to one embodiment of the invention.

FIG. 2 illustrates an exemplary embodiment of the mobile device 110A in one embodiment of the invention. It should be understood that the mobile devices 110B-110N include similar modules and structures and perform similar operations as will be described with reference to FIG. 2. It should also be understood that the architecture of the mobile device 110A illustrated in FIG. 2 is exemplary, and other, alternative architectures may be used with the embodiments of the invention described herein (e.g., modules may be combined, added, removed, etc.). FIG. 2 will be described with reference to the exemplary operations of FIGS. 4-8. However, it should be understood that the embodiment of FIG. 2 may be performed by operations other than those discussed with reference to FIGS. 4-8, and the operations discussed with reference to FIGS. 4-8 can be performed by different embodiments than those discussed with reference to FIG. 2.

With reference to FIG. 2, multiple applications 210 have been installed on the mobile device 110A with at lest some of these applications having the capability to receive notification messages (other applications are stand-alone applications or other types of applications which do not support notification messages). For those applications which support notification messages, at least some of those applications include a notification message preference setting. In one embodiment of the invention, users of the mobile device 110A may select between a setting that indicates notification messages are to be received for a given application and a setting that indicates notification messages are not to be received for that application. The selection may take numerous forms including selecting via a radio button, checkboxes, pull-down menu, etc. In one embodiment of the invention the default setting is to receive notification messages for a particular application while in another embodiment of the invention the default setting is to not receive notification messages for that particular application.

The notification message manager 205 is coupled with those ones of the applications 210 that support notification messages. The notification message manager 205 includes the notification message preference controller module 240, the compacted representation generator module 245, the compacted representation transmission module 250, and the notification message processing module 255.

The notification message preference controller module 240 receives the notification message preferences for the applications and stores a representation of those preferences in one or more notification message preference data structures 215. The notification message preference data structure(s) 215 may include multiple notification message preference lists (e.g., a list of application identifiers corresponding with applications that may receive notification messages (hereinafter "whitelist") and a blacklist of application identifiers corresponding with applications that may not receive notification messages (hereinafter "blacklist")). For example, the notification message preference controller module 240 stores the application identifiers corresponding with those applications that may receive notification messages (according to the notification message preferences) in the whitelist and stores the application identifiers corresponding with those applications that may not receive notification messages (according to the notification message preferences) in the blacklist.

In embodiment of the invention, the notification message manager 205 is also coupled with the hash generator 200. The hash generator 200 applies a hashing algorithm (e.g., SHA-0, SHA-1, SHA-2, MD5, WHIRLPOOL, or other hashing algorithm) to each of the application identifiers (and optionally a same random number generated by the random number generator 230) on each of the notification message preference lists (the whitelist and the blacklist) when generating a probabilistic representation of the whitelist or the blacklist. While in one embodiment of the invention each of the mobile devices 110A-110N use the same hashing algorithm, in other embodiments of the invention different ones of the mobile devices 110A-110N use different hashing algorithms. The hashing results (message digests) are passed to the compacted generator module 245 of the notification message manager 205.

The compacted representation generator module 245 generates compacted representations for each notification message preference list (e.g., a compacted representation of the whitelist and a compacted representation of the blacklist) and stores the generated compacted representations in the compacted representation data structure 225. The compacted representation transmission module 250 transmits the compacted representations to the courier(s) associated with the mobile device 110A along with an indication which of the compacted representations is for the whitelist and which is for the blacklist. If the compacted representation generator module 245 generates probabilistic representations of the whitelist and the blacklist, and a random number (used to salt the probabilistic representations) is added to the application identifiers during the creation of the probabilistic representations (e.g., prepended, or appended to each application identifier), the compacted representation transmission module 250 also transmits that random number to those couriers. In addition, in one embodiment of the invention, the probabilistic representation transmission module 250 transmits hash properties (which will be described in greater detail later herein) to those couriers.

The notification message preference lists and/or the compacted representations of the notification message preference lists must be updated, recreated, and/or transmitted to the couriers in different situations (e.g., an application that supports notification message is newly installed, an application previously included in one of the notification message preference lists is removed from the system, a notification message preference has changed for a particular application (e.g., an application identifier has moved from the whitelist to the blacklist (or from the blacklist to the whitelist), a mobile device has moved to a different courier, and a mobile device is reestablishing its connection with a courier).

Figure 4:
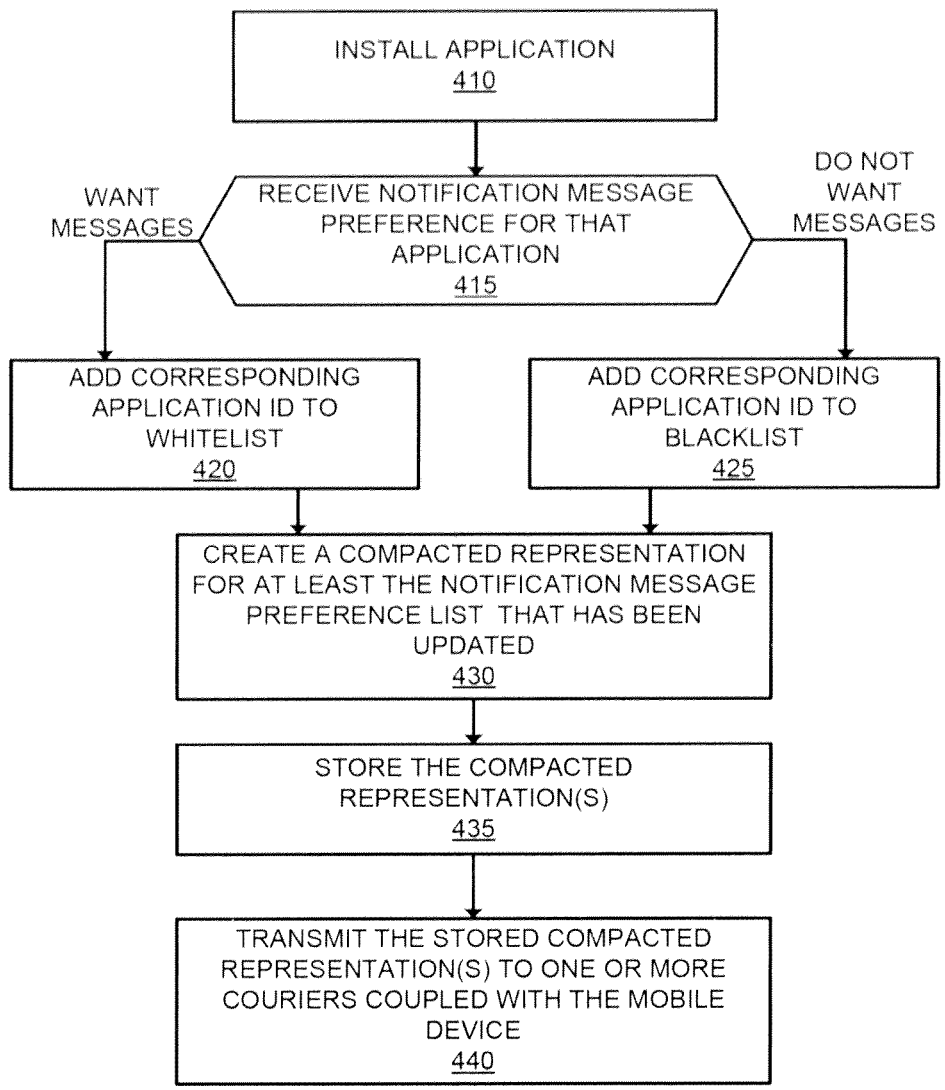
FIG. 4 is a flow diagram illustrating an exemplary method for generating a compacted representation of a whitelist of applications that may receive notification messages and a compacted representation of a blacklist that may not receive notification messages according to one embodiment of the invention.

FIG. 4 is a flow diagram illustrating an exemplary method for generating a compacted representation of a whitelist and a compacted representation of a blacklist upon a new application being installed on a mobile device according to one embodiment of the invention. At block 410, a new application that supports notification messages is installed on the mobile device 110A. The application may be installed in numerous ways (e.g., a user downloading the application to the mobile device 110A over a mobile network connection directly and then installing, a user downloading the application to a separate computing device (e.g., laptop, computer workstation, etc.) and then connecting the mobile device 110A to that separate computing device and installing the application, etc.). Flow moves from block 410 to block 415.

At block 415, the notification message preference controller module 240 receives a notification message preference for the installed application. The notification message preference for the application may be received from a user that installed the application or may be a default notification message preference (e.g., if the if the user does not provide a preference). If the preference indicates that the mobile device 110A may receive notification messages for the application, then flow moves to block 420 where the notification message preference controller module 240 adds the application identifier that corresponds with the installed application to the whitelist (in the notification message preference data structure(s) 215). If the preference indicates that the mobile device 110A may not receive notification messages for the application, then How moves to block 425 where the notification message preference controller module 240 adds the application identifier that corresponds with the application to the blacklist (in the notification message preference data structure(s) 215). Flow moves from blocks 420 and 425 to the block 430.

At block 430, the compacted representation generator module 245 creates or updates a compacted representation of at least the notification message preference list that includes the application identifier corresponding to the newly installed application. Since an installed application will either have a preference of receiving notification messages (and thus be represented on the whitelist) or have a preference of not receiving notification messages (and thus be represented on the blacklist), in one embodiment of the invention only a compacted representation of the notification message preference list that includes the application identifier of that application is created or updated, The other notification message preference list may remain unchanged. For example, if the application identifier was added to the whitelist, then only the compacted representation of the whitelist needs to be created or updated. In another embodiment of the invention, both compacted representations may be recreated.

If the compacted representation generator module 245 creates or updates a compressed whitelist or blacklist, it applies a lossless compression algorithm (e.g., ZIP, run-length encoding, LZW, or other lossless compression algorithm) on the whitelist and the blacklist.

If the compacted representation generator module 245 creates or updates a probabilistic representation of the whitelist or blacklist, in one embodiment of the invention it clears the bits of the current probabilistic representation (if one exists), and recreates the probabilistic representation to include the new application identifier along with all of the other application identifiers on that notification message preference list). The creation of the probabilistic representation(s) may include the operations which will be described with reference to FIG. 8. In another embodiment of the invention, upon an installation of a new application, instead of recreating a probabilistic representation of all of the application identifiers on the notification message list(s) (e.g., including re-hashing each application identifier on the notification message list, dividing the result hashes into a number of segments, calculating the values of each of the segments, and setting a bit in the probabilistic representation that corresponds to those values), the probabilistic representation of the existing notification message list is updated only with a representation of the application identifier of the installed application. If a random number was used during creation of the original probabilistic representation of the notification message list, that same random number is used when updating that probabilistic representation with the representation of the application identifier of the installed application. In this embodiment of the invention, the notification message preference list that was not affected by the installation of the new application is not changed or modified.

Referring back to FIG. 4, flow moves from block 430 to block 435, where the created compacted representation(s) are stored in the compacted representation data structure 225. If the created compacted representation(s) are probabilistic representation(s) and a random number was used, it is also stored in the compacted representation data structure 225. In one embodiment of the invention, hashing properties (e.g., the hashing algorithm that was used and the number of segments used when creating the probabilistic representation(s)) are also stored in the compacted representation data structure 225. Flow moves from block 435 to block 440.

At block 440, the compacted representation transmission module 250 transmits at least the compacted representation of the notification message preference list that has been updated along with an indicators) of which list(s) (whitelist or blacklist) are being transmitted to the one or more couriers coupled with the mobile device 110A (e.g., to the courier 115A). If the created compacted representation(s) are probabilistic representation(s) and a random number was used, that random number is also transmitted to the courier 115A. In addition, in one embodiment of the invention, the hashing properties are also transmitted to the courier 115A.

While FIG. 4 has been described with reference to compacted representations of the whitelist and the blacklist similar operations apply if the whitelist and blacklist are transmitted without being compacted (with the exception that the operation of block 430 is omitted and the mobile device 110A transmits at least the notification message preference list that has been updated or alternatively transmits at least the application identifier and the notification message preference to the courier 115A to update the stored notification message preference list for the mobile device 110A).

Figure 5:
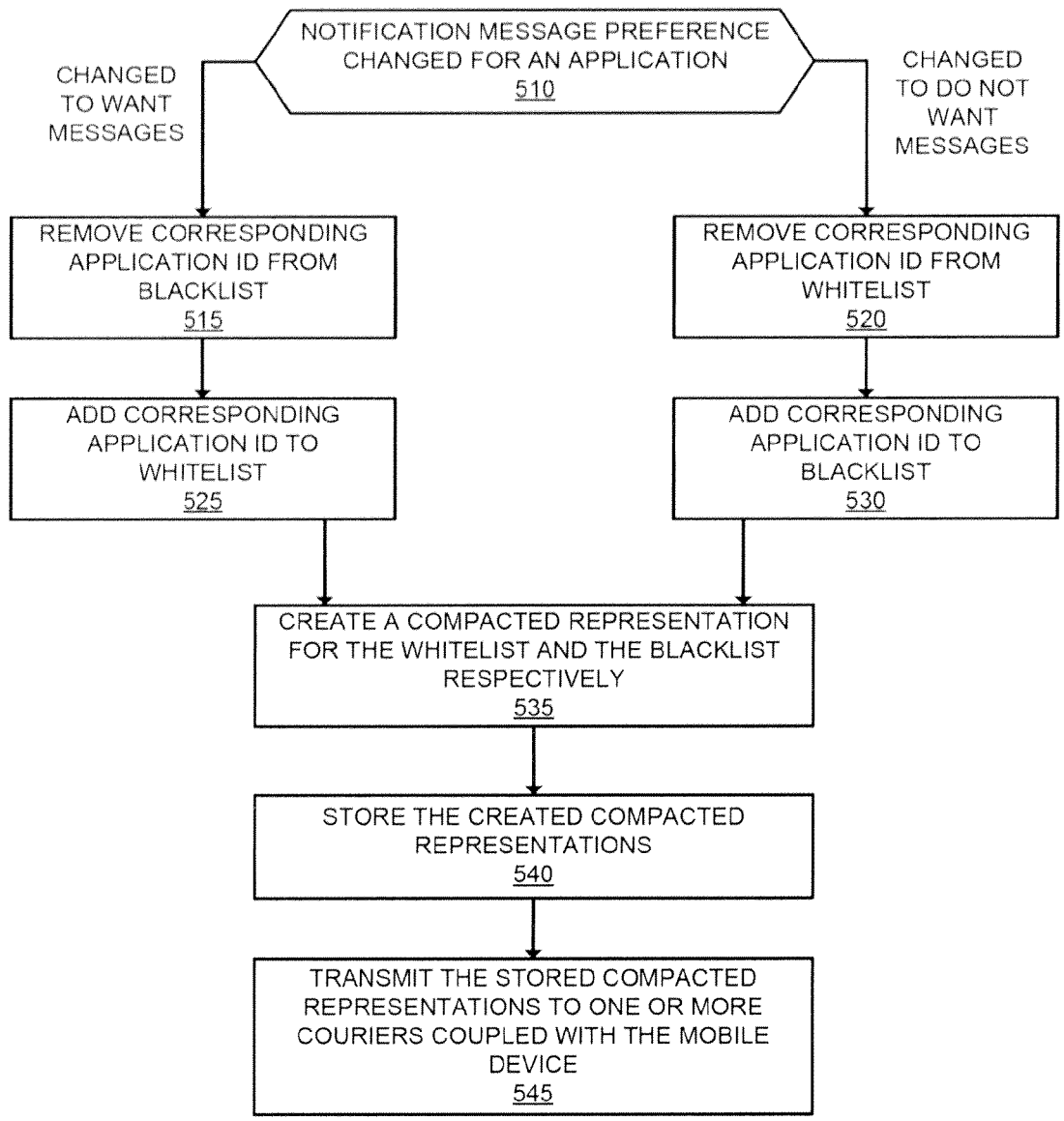
FIG. 5 is a flow diagram illustrating an exemplary method for generating a compacted representation of a whitelist of applications that may receive notification messages and a compacted representation of a blacklist that may not receive notification messages upon a notification message preference change according to one embodiment of the invention.

FIG. 5 is a flow diagram illustrating an exemplary method for generating a compacted representation of a whitelist of applications that may receive notification messages and a compacted representation of a blacklist that may not receive notification messages upon a notification message preference change according to one embodiment of the invention.

At block 510, the notification message preference for an installed application has changed (e.g., from wanting to receive notification messages to not wanting to receive notification messages, or from wanting not to receive notification messages to wanting to receive notification messages). The notification message preference may be changed by a user of the mobile device 110A.

With reference to FIG. 2, the notification message preference controller module 240 receives the notification message preference change and updates the whitelist and the blacklist accordingly. If the notification message preference indicates a change from not wanting to receive notification messages to wanting to receive notification messages for a particular application, then flow moves to block 515. If the notification message preference indicates a change from wanting to receive notification messages to not wanting to receive notification messages for the application, then (low moves to block 520.

At block 515, the notification message preference controller module 240 removes the application identifier that corresponds with that application from the blacklist. Flow moves from block 515 to block 525, where the notification message preference controller module 240 adds the application identifier that corresponds with that application to the whitelist.

At block 520, the notification message preference controller module 240 removes the application identifier that corresponds with that application from the whitelist, Flow moves from block 520 to block 530, where the notification message preference controller module 240 adds the application identifier that corresponds with that application to the blacklist. Thus, the blacklist and the whitelist are each modified. Flow moves from both of the blocks 525 and 530 to the block 535.

At block 535, a compacted representation of the whitelist and a compacted representation of the blacklist are created. The operations to create the compacted representations are similar to that as described with reference to block 430 of FIG. 4. Generation of probabilistic representations will be described in more detail in reference to FIG. 8. Flow moves from block 535 to block 540, where the created compacted representations are stored in the compacted representation data structure 225 (e.g., as similarly described with reference to block 435 of FIG. 4). Flow moves from block 540 to block 545.

At block 545, the compacted representation transmission module 250 transmits the compacted representation of the whitelist and the compacted representation of the blacklist along with indicator(s) (e.g., a bit set to 1 for whitelist and a bit set to 0 for a blacklist) that indicate which list each compacted representation represents to the one or more couriers coupled with the mobile device 110A (e.g., to the courier 115A). If the created compacted representation(s) are probabilistic representation(s) and a random number was used, that random number is also transmitted to the courier 115A. In addition, in one embodiment of the invention, the hashing properties are also transmitted to the courier 115A.

While FIG. 5 has been described with reference to compacted representations of the whitelist and the blacklist, similar operations apply if the whitelist and blacklist are transmitted without being compacted (with the exception that the operation of block 535 is omitted and the mobile device 110A transmits the whitelist and blacklist to the courier 115A).

Figure 6:
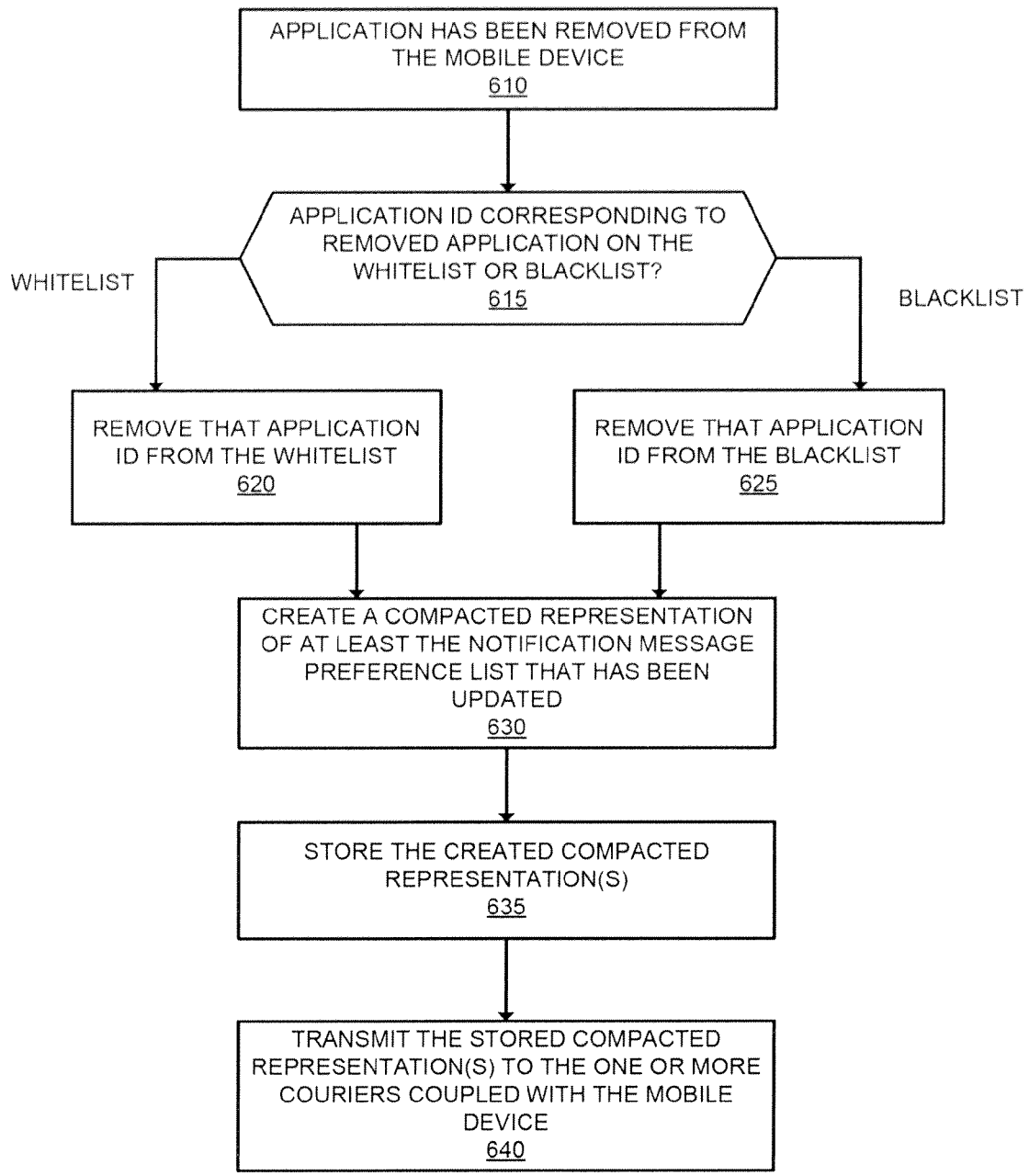
FIG. 6 is a flow diagram illustrating an exemplary method for generating at least a compacted representation of the notification message preference list affected by an application being removed from the mobile device according to one embodiment of the invention.

FIG. 6 is a flow diagram illustrating an exemplary method for generating at least a compacted representation of the notification message preference list affected by an application being removed from the mobile device according to one embodiment of the invention.

At block 610, an application that supports notification messages has been removed (or rendered inaccessible) from the mobile device 110A (e.g., a user has uninstalled/deleted the application, the subscription for the application has expired, etc.). In one embodiment of the invention, the notification message preference controller module 240 detects or otherwise is made aware that an application represented on either the whitelist or the blacklist has been removed, or is in the process of being removed, from the mobile device 110A. Flow moves from block 610 to block 615.

Since an application that supports notification messages is either represented on the whitelist or the blacklist at a given time, at block 615 the notification message preference controller module 240 determines whether the application identifier corresponding with that application is on the whitelist or is on the blacklist. If that application identifier is on the whitelist, then flow moves to block 620 where the notification message preference controller module 240 removes that application identifier from the whitelist. If that application identifier is on the blacklist, then flow moves to block 625 where the notification message preference controller module 240 removes that application identifier from the blacklist. Flow moves from both of the blocks 620 and 625 to the block 630.

At block 630, a compacted representation of at least the notification message preference list that has been updated (the list that the application identifier was removed from) is recreated. The compacted representation of the notification message preference list that did not include that application identifier may not be recreated or updated. Of course, it should be understood that both of the compacted representations may be recreated. The operations to create the compacted representations are similar to that as described with reference to block 430 of FIG. 4. Generation of probabilistic representation(s) (e.g., Bloom filters) will be described in more detail in reference to FIG. 8. Flow moves from block 630 to block 635.

At block 635, the created compacted representation(s) are stored in the compacted representation data structure 225. If the created compacted representation(s) are probabilistic representation(s) and a random number was used during the creation, that random number is also stored in the compacted representation data structure 225. In addition, if the created compacted representation(s) are probabilistic representation(s), in one embodiment of the invention hashing properties (e.g., an indication of the hashing algorithm used and the number of segments used when creating the probabilistic representation(s)) are also stored in the compacted representation data structure 225. Flow moves from block 635 to block 640.

At block 640, the compacted representation transmission module 250 transmits to the one or more couriers coupled with the mobile device 110A (e.g., the courier 115A), at least the compacted representation of the notification message preference list that has been updated along with an indicator(s) that indicates which list the compacted representation(s) represents (e.g., whitelist or blacklist). If the created compacted representation(s) are probabilistic representation(s) and a random number was used during the creation, that random number is also transmitted to the courier 115A. In addition, if the created compacted representation(s) are probabilistic representation(s), in one embodiment of the invention hashing properties are also transmitted to the courier 115A.

While FIG. 6 has been described with reference to compacted representations of the whitelist and the blacklist, similar operations apply if the whitelist and blacklist are transmitted to the courier 115A without being compacted (with the exception that the operation of block 630 is omitted and the mobile device 110A transmits the whitelist and blacklist to the courier 115A).

Figure 7A:
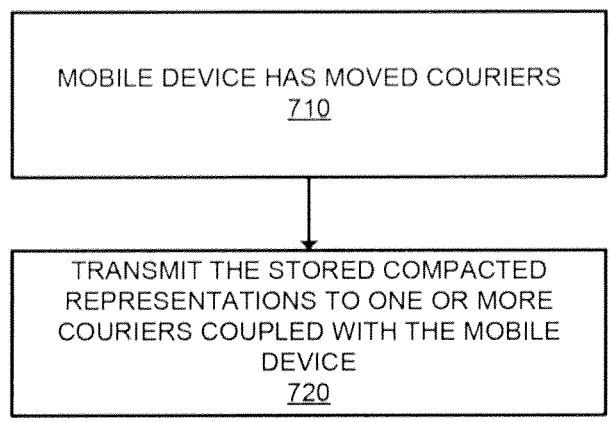
FIG. 7A is a flow diagram illustrating an exemplary method for transmitting a compacted representation of a whitelist of applications that may receive notification messages and a compacted representation of a blacklist that may not receive notification messages to a courier upon the mobile devices moving to that courier according to one embodiment of the invention.

FIG. 7A is a flow diagram illustrating an exemplary method for transmitting a compacted representation of a whitelist of applications that may receive notification messages and a compacted representation of a blacklist that may not receive notification messages to a courier upon the mobile devices moving to that courier according to one embodiment of the invention.

At block 710, the mobile device 110A has moved couriers. As previously described, each of the mobile devices 110A-110N is capable of moving to different geographical locations throughout the network 100 which may cause that mobile device to be coupled to different ones of the couriers 115A-115N (the couriers are in fixed geographic locations), for example, upon the mobile device 110A moving to a different geographic location in the United States (e.g., from the West Coast of the United States to the East Coast of the United States), it is likely that the mobile device 110A will be serviced by a different courier in that different geographic location. It should be understood that there may be hundreds or thousands of couriers spread throughout the network. Instead of having each courier in the network storing the compacted representations of the whitelist and blacklist for each mobile device in the network (and therefore the transmission of those compacted representations to each of the couriers), each of the mobile devices 110A-110N will transmit their compacted representations to the courier(s) that are currently providing service to them. If a mobile device establishes a connection with a different courier (e.g., the mobile device has moved), the mobile device will transmit the compacted representations of their whitelist and blacklist to that courier. Flow moves from block 710 to block 720.

Assuming that the mobile device 110A has previously generated the compacted representations of the whitelist and the blacklist (and has stored those compacted representations), at block 720, the compacted representation transmission module 250 transmits those stored compacted representations, and any other associated information (e.g., random number(s), hashing properties, mobile device identification, compacted representation indicator(s), etc.) to the courier that is providing service to the mobile device 110A. Thus, instead of generating new compacted representations, in one embodiment of the invention the mobile device 110A simply transmits the stored compacted representations.

In another embodiment of the invention, if some of the mobile devices 110A-110N create probabilistic representations of their whitelist and blacklist, those ones of the mobile devices 110A-110N create new probabilistic representations (e.g., with use of a different random number) upon each new connection that is established with different ones of the couriers 115A-115N.

While FIG. 7A has been described with reference to compacted representations of the whitelist and the blacklist, similar operations apply if the whitelist and blacklist are transmitted to the courier 115A without being compacted. Thus, in one embodiment of the invention, the mobile device 110A transmits the whitelist and blacklist to different ones of the couriers 115A-115N as it establishes new connections with those ones of the couriers 115A-115N.

Figure 7B:
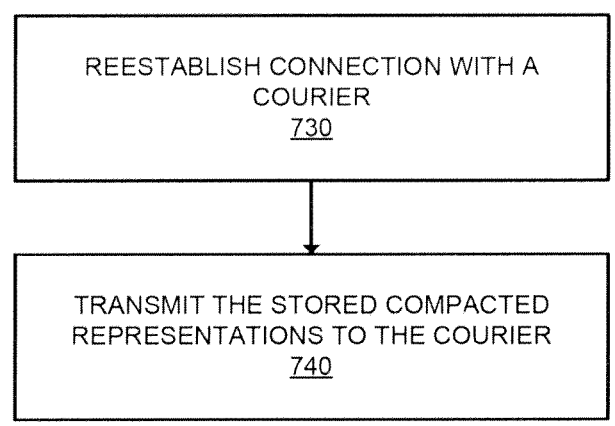
FIG. 7B is a flow diagram illustrating an exemplary method for transmitting a compacted representation of a whitelist and a compacted representation of a blacklist to a courier upon reestablishing a connection with that courier according to one embodiment of the invention.

FIG. 7B is a flow diagram illustrating an exemplary method for transmitting a compacted representation of a whitelist and a compacted representation of a blacklist to a courier upon reestablishing a connection with that courier according to one embodiment of the invention.

At block 730, the mobile device 110A has established (or reestablished) a connection with a courier. The connection between the mobile device 110A and the courier 115A will be torn down after a period of time that the courier 115A cannot reach the mobile device 110A. For example, the connection is torn down sometime after the mobile device 110A has powered down. Since the amount of memory or storage space on each courier is limited, and there may be thousands of mobile devices which may only have temporary connections, in one embodiment of the invention the couriers 115A-115N remove the stored compacted representations of a particular mobile device upon the connection to that mobile device being torn down. Upon powering up, the mobile device 110A will establish a connection with a courier (this may be the same courier it previously was coupled to). Flow moves from block 730 to block 740.

Assuming that the mobile device 110A has previously generated and stored the compacted representations of the whitelist and the blacklist, and no notification message preferences have changed, at block 740, the stored compacted representations are transmitted to the courier the mobile device 110A has established a connection with (e.g., the courier 115A). Thus in this embodiment of the invention, the compacted representations are stored in non-volatile memory on the mobile device 110A.

While FIG. 7B has been described with reference to compacted representations of the whitelist and the blacklist, similar operations apply if the whitelist and blacklist are transmitted to the courier 115A without being compacted.

Figure 8:
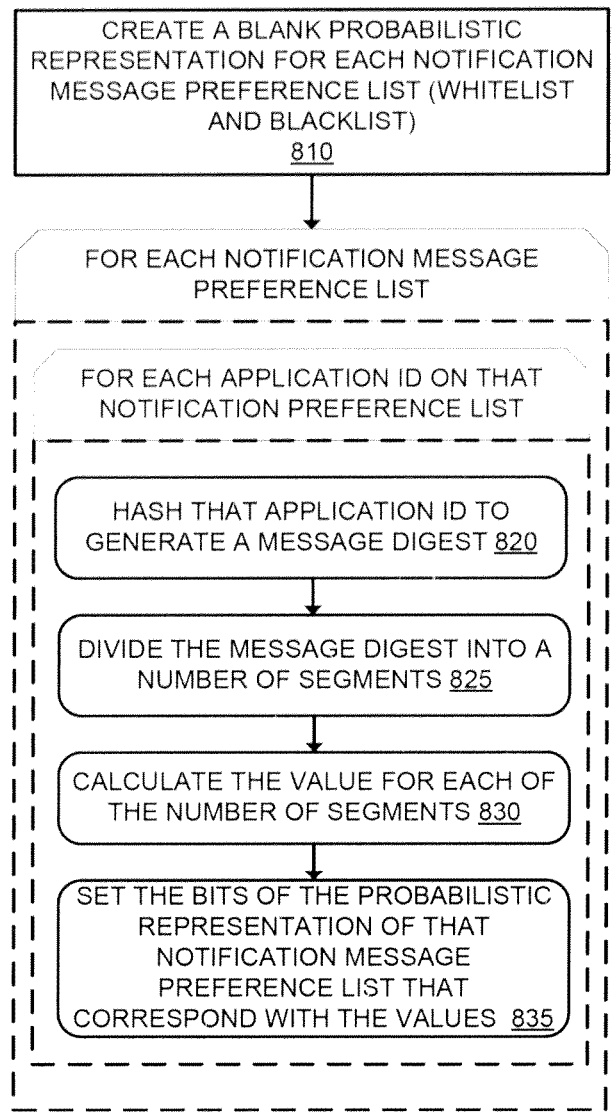
FIG. 8 is a How diagram illustrating an exemplary method for generating a probabilistic representation of a notification message preference list according to one embodiment of the invention.

FIG. 8 is a flow diagram illustrating an exemplary method for generating a probabilistic representation of a notification message preference list according to one embodiment of the invention. The operations of FIG. 8 are applicable for generating the probabilistic representation of the whitelist and the probabilistic representation of the blacklist. The operations of FIG. 8 will be described with reference to the exemplary embodiment of FIG. 2. However, it should be understood that the operations of FIG. 8 can be performed by embodiments of the invention other than those discussed with reference to FIG. 2, and the embodiments discussed with reference to FIG. 2 can perform operations different than those discussed with reference to FIG. 8. The operations of FIG. 8 may be used to generate the compacted representations as described in blocks 430, 535, and 630 in FIGS. 4, 5, and 6 respectively, compacted representation generator module 245 creates a blank probabilistic representation for each notification message preference list (e.g., whitelist and blacklist). These blank probabilistic representations include all bits set to zero. FIG. 10A illustrates a probabilistic representation of a notification message preference list 1010 with all bits set to zero according to one embodiment of the invention. As illustrated in FIG. 10A, each bit (from an index 0 to M) of the probabilistic representation of a notification message preference list 1010 is set to zero.

The accuracy of the probabilistic representation of the whitelist and the blacklist increases as the size of the probabilistic representation increases, but even a relatively small size of a probabilistic representation for each list (e.g., 512 bytes) is sufficient (of course, other sizes may be used). Of course, as the number of applications installed on the mobile device 210 significantly increase, the size of the probabilistic representation may also be increased.

It should be understood that a probabilistic representation of a notification message preference list is much smaller in size than the notification message preference list itself. As previously described, an application identifier is typically a string of characters which may be upwards of 50 UTF-8 (or UTF-16) characters in length. If there are 100 application identifiers, each of which is 50 UTF-8 (or UTF-16) characters in length, then the combined size of the whitelist and the blacklist is approximately 5 kB. Using a 512 byte size probabilistic representation each for the whitelist and the blacklist results in a combined size of 1 kB. It should also be understood that as the number of the applications installed on the mobile device 110A increases the size of the whitelist and blacklist also increase (approximately linearly) while the size of the probabilistic representations of the whitelist and blacklist increase at a far slower logarithmic ratio.

Flow moves from block 810 to block 820. The operations beginning at block 820 through block 835 are performed for each notification message preference list (e.g., whitelist and blacklist), and for each application identifier on those lists. At block 820, the hash generator 220 hashes the application identifier resulting in a message digest. Although not illustrated in FIG. 8, in one embodiment of the invention, a random number is added (e.g., prepended, appended, etc.) to the application identifier prior to the hashing (the same random number will be added to each application identifier on one or more of the notification message preference lists). The resulting message digest is passed to the compacted representation generator module 245. Flow moves from block 820 to block 825.

Since the message digest of most hashing algorithms includes more bits than the blank probabilistic representation of the notification message preference list, at block 825 the compacted representation generator module 245 divides the bits of that message digest into a number of segments such that each segment has a value between zero and the total size of the probabilistic representation. For example, the size of the segments may be calculated by taking the floor of the logarithm of the total size of the probabilistic representation (in bits, e.g., 4096 bits) divided by the logarithm of 2. In the case that the size of the probabilistic representation is 512 bytes (4096 bits), the size of the segments is 12. As the number of segments increase the accuracy of the representation also increases, however even a relatively small number (e.g., 3-5) is acceptable. The number of segments (K) may be greater than or equal to 1 and less than or equal to the floor of the size of the message digest divided by the size of the segments. In one embodiment of the invention, the size of the probabilistic representation is 4096 bits, the size of the output of the hashing algorithm is 160 bits, the size of each segment is 12, and the number of segments is 5.

The compacted representation generator 245 may divide the message digest into the number of segments in any way. Using the above example where the size of each segment is 12 and the number of segments is 5, the compacted representation generator 245 may take the first five 12-bit sections of the message digest. Of course, in the same example, the last five 12-bit sections of the message digest may be used or any five 12-bit sections of the message digest.

Assuming a maximum of 256 application identifiers in a given list and the number of segments is 5, a possibility of collision (a false positive on the list) is given by the ratio 0.00139, With a list of 128 application identifiers and the number of segments being 5, the probability of a collision (a false positive on the list) is 5.33e-05.

Flow moves from block 825 to block 830. At block 830, the compacted representation generator module 245 calculates the value for each of the number of segments. This calculated value will be used as an index into a particular bit of the probabilistic representation. Flow moves from block 830 to block 835. At block 835, the compacted representation generator module sets the bit that corresponds to the calculated value of the probabilistic representation. As described above, each of the operations at blocks 820 are performed for each application identifier on each notification message preference list.

Figure 3:
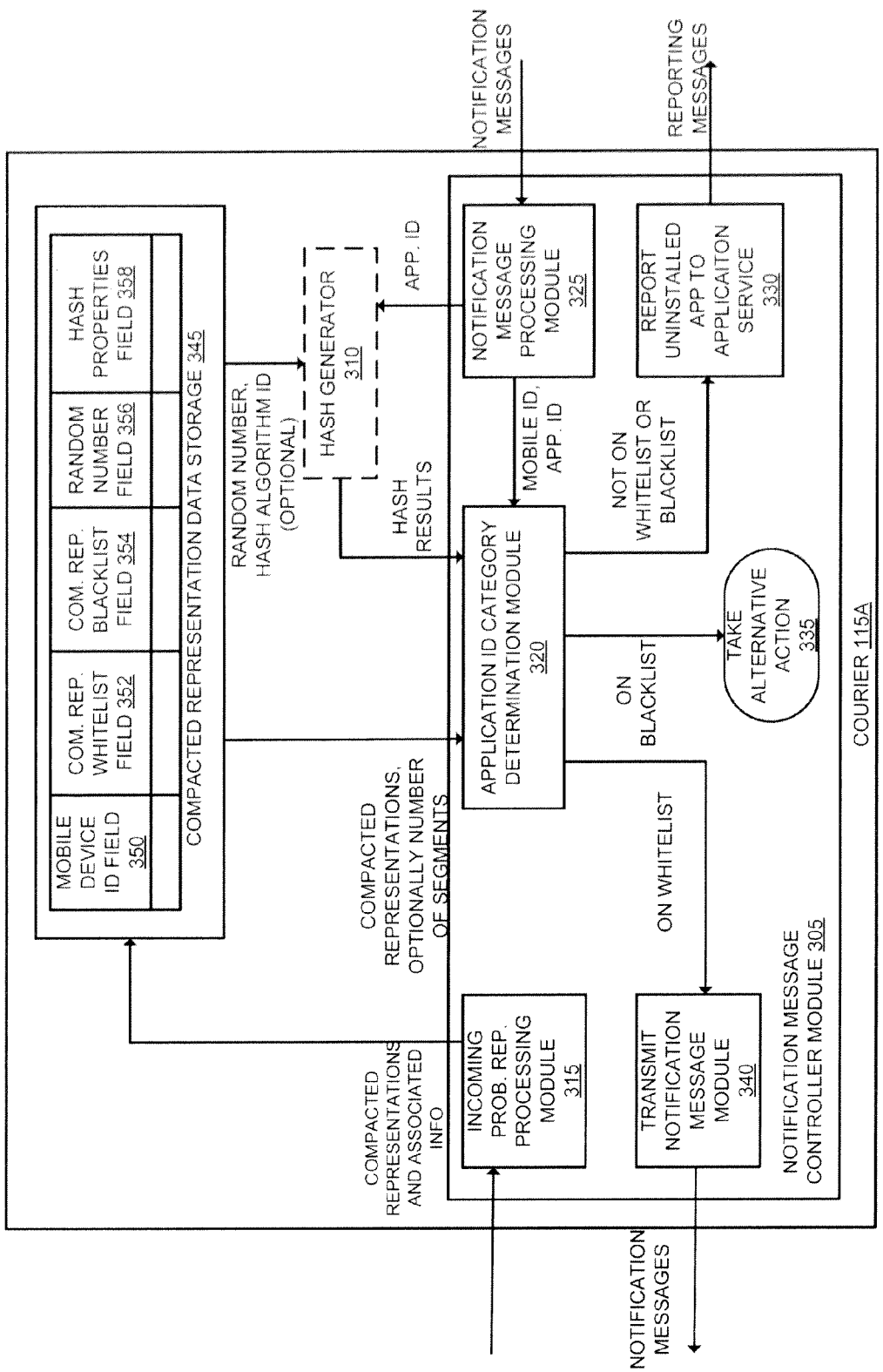
FIG. 3 illustrates an exemplary courier according to one embodiment of the invention.

As described above, the couriers 115A-155N use the transmitted compacted representations during processing of notification messages they receive from the application servers 120A-120N. FIG. 3 illustrates an exemplary courier 115A according to one embodiment of the invention. It should be understood that the couriers 115B-115N include similar modules and structures and perform similar operations as will be described with reference to FIG. 3. It should also be understood that the architecture of the courier 115A illustrated in FIG. 3 is exemplary, and other, alternative architectures may be used with the embodiments of the invention described herein (e.g., modules may be combined, added, removed, etc.).

As illustrated in FIG. 3, the courier 115A includes the notification message controller module 305, the compacted representation data storage 345, and optionally the hash generator 310 (which will be used if the compacted representations are probabilistic representations). The notification message controller module 305 includes the incoming compacted representation processing module 315, the application identifier category determination module 320, the notification message processing module 325, the transmit notification message module 340, and the report uninstalled application to application service module 330.

The incoming compacted representation processing module 315 receives and processes compacted representations, and other associated information (e.g., mobile device identification, random numbers used in the generation of the probabilistic representations, hash properties used in the generation of the probabilistic representations, etc.) transmitted from the mobile devices it is servicing (currently coupled with) (e.g., the mobile devices 110A and 110B). It should be understood that at any given time, a single courier might be providing services for thousands of mobile devices. The compacted representation processing module 315 stores the received compacted representations and other associated information in the compacted representation data storage 345.

If the received compacted representations are compressed notification message preference lists, in one embodiment of the invention the compacted representation processing module 315 decompresses those notification message preference lists prior to storing them in the compacted representation data storage 345, while in another embodiment of the invention the compacted representation processing module 315 causes the compressed lists to be stored (they will be later decompressed on the fly).

The compacted representation data storage 345 includes the mobile device identification field 350, the compacted representation of the whitelist field 352, the compacted representation of the blacklist field 354, and optionally the random number field 356 and the hash properties field 358. The mobile device identification field 350 stores identifications of the mobile nodes that have transmitted compacted representations to the courier 115A. The compacted representation of the whitelist field 352 and the compacted representation of the blacklist 354 stores the compacted representations of the whitelist and blacklist (by mobile device) (or optionally stores a pointer to the compacted representations of the whitelist and blacklist) transmitted by the mobile devices respectively. If the compacted representations are probabilistic representations and a random number was included in the transmission, that random number is stored in the random number field 356. Any hash properties (e.g., hashing algorithm used, number of segments, etc.) that are received by the courier 115A are stored by mobile device in the hash properties field 358. It should be understood that other fields may be stored in the compacted representation data storage 345 such as timestamps, etc.

The notification message processing module 325 processes notification messages received from the application servers 120A-120N that are destined for those mobile devices that are coupled to the courier 115A (e.g., the mobile devices 110A and 110B). Each notification message includes an application identifier and a mobile device identifier The notification message processing module 325 parses each received message to determine the application identifier and the mobile device identifier in the message. According to one embodiment of the invention, the notification message processing module 325 also retrieves at least some of the data stored in the compacted representation data storage 345 for the mobile device as indicated in the mobile device identifier included in the notification message (e.g., the random number used when generating a probabilistic representation of a notification message preference list, the hash properties used). According to another embodiment of the invention, if no random numbers are used and the hash properties are known (e.g., the same hashing algorithm and the same number of segments are used by each of the mobile devices 110A-110N and each of the couriers 115A-115N), the notification message processing module 325 does not retrieve any additional data from the compacted representation data storage 345.

The courier 115A delivers only those notification messages for a given mobile device that include an application identifier that matches the compacted representation of the whitelist stored for that mobile device. If the compacted representations are probabilistic representations, then sometime after receiving and processing a notification message, the notification message processing module 325 passes the application identifier to the hash generator module 310 to begin the determination of what action to take for the received notification message (e.g., forward to the mobile device, drop, store, or report as uninstalled to the sender), In one embodiment of the invention, m addition to the application identifier, the hash generator 310 is passed the random number used when generating the probabilistic representations (if one was used) and/or an identification of the hash algorithm used when generating the probabilistic representations. For example, for a particular mobile device identifier, if the random number field 356 includes a random number, that random number will be passed to the hash generator 310. Similarly, if the hash properties field 358 includes a hash algorithm identification, that hash algorithm identification will be passed to the hash generator 310.

If the compacted representations are compressed versions of the whitelist and the blacklist, the application identifier category determination module 320 determines whether the application identifiers included in the notification messages match any of the application identifiers on the decompressed whitelist or the decompressed blacklist. If the whitelist and blacklist have not been decompressed, in one embodiment of the invention the application identifier category determination module 320 decompresses those lists (e.g., on the fly). For each notification message, the application identifier category determination module 320 first checks the whitelist for a match for the included application identifier. If the application identifier is on the whitelist, then the transmit notification message module 340 transmit the notification message to the mobile device as identified in the message. If the application identifier is not on the whitelist, the application identifier category determination module 320 checks the blacklist. If the application identifier is on the blacklist, then alternative action is taken 335 (e.g., the notification message is dropped). If the application identifier is not on the whitelist and is not on the blacklist (thus the application is not installed on that mobile device), then the report uninstalled application to application server module 330 transmits a message to the application server that sent the notification message that the application is not installed on the mobile device (so that the application server will stop sending notification messages for that application to that mobile device).

If the compacted representations are probabilistic representations, the hash generator module 310 hashes the application identifier (or the random number added to the application identifier in some embodiments) using the same hash algorithm as was used when generating the probabilistic representations of that mobile device. According to one embodiment of the invention, the same hash algorithm is used to generate all of the probabilistic representations for that mobile device. In another embodiment of the invention, the hash generator module 310 hashes the application identifier using the hash algorithm identified in the hash properties field 358 for that mobile device. The result of the hashing (message digest) is passed to the application identification category determination module 320. The application identification category determination module 320 determines whether the result matches one of the representations on the probabilistic representation of the whitelist of the mobile device or on the probabilistic representation of the blacklist of that mobile device. If the hash results match a representation on the probabilistic representation of the whitelist, then the transmit notification message module 340 transmits that notification message to the mobile device. If the hash results do not match a representation on the probabilistic representation of the whitelist but does match a representation on the probabilistic representation of the blacklist, then alternative action will be taken 335 (e.g., the notification message is dropped). The application identification category determination module may determine whether the result matches using the exemplary operations that will be described in reference to FIGS. 9, 11A, and 11B. For example, in one embodiment of the invention, the application identification category determination module 320 includes the message segmenter 1135, the value calculator 1145, and the check bit module 1155, which will each be described in greater detail in reference to FIGS. 11A and 11B.

Figure 9:
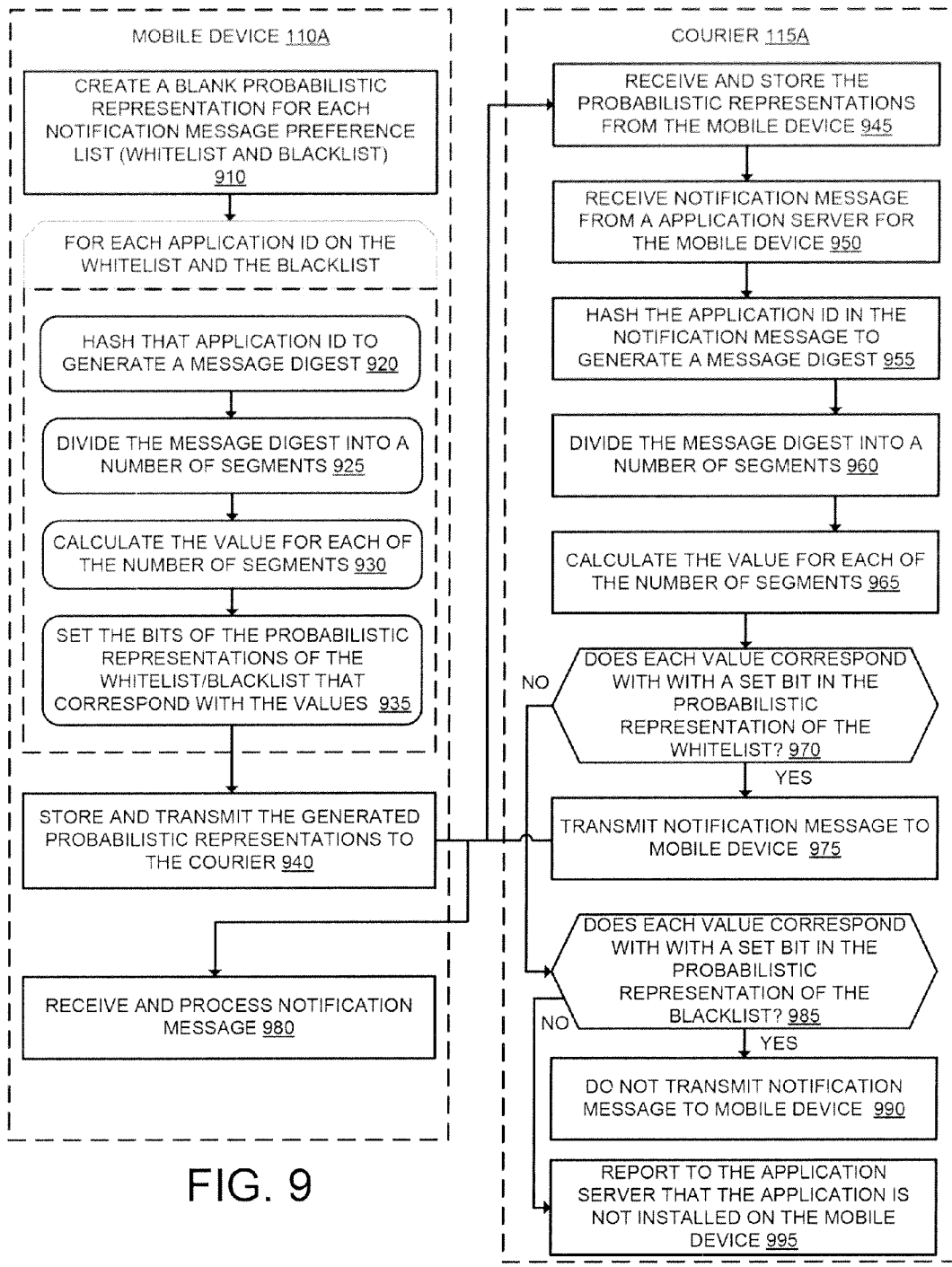
FIG. 9 is a How diagram illustrating a mobile device generating and transmitting the probabilistic representations of the notification message preference lists and a courier using those probabilistic representations upon receiving a notification message from a notification service according to one embodiment of the invention.

FIG. 9 is a flow diagram illustrating the mobile device 110A generating and transmitting probabilistic representations of the notification message preference lists and the courier 115A using those probabilistic representations upon receiving a notification message from a notification service according to one embodiment of the invention. FIG. 9 will be described with reference to the exemplary embodiments of FIGS. 10A, 10B, 11A, and 11B. However, it should be understood that the operations of FIG. 9 can be performed by embodiments of the invention other than those discussed with reference to FIGS. 10A, 10B, 11A, and 11B, and the embodiments discussed with reference to FIGS. 10A, 10B, 11A, and 11B can perform operations different than those discussed with reference to FIG. 9.

The blocks 910-935 illustrated in FIG. 9 perform operations similar to the operations of blocks 810-835 illustrated in FIG. 8 to generate the probabilistic representations of the whitelist and the blacklist. For example, each of the operations 910-935 are performed on each application identifier on each of the whitelist and the blacklist. At block 910, a black probabilistic representation of each notification message preference list (whitelist and blacklist) is created. FIG. 10A illustrates a clear probabilistic representation of a notification message list 1010. As illustrated, each bit (from an index 0 to M) of the probabilistic representation of a notification message list 1010 is set to zero. Flow moves from block 910 to block 920.

At block 920, an application identifier (optionally added with a random number) is hashed to generate a message digest. With reference to FIG. 10B, which illustrates a probabilistic representation of a single application identifier on the notification message preference list 1060, the random number 1020 and the application identifier 1015 are added and hashed by the hash generator 1025 producing the message digest 1030. In the example of FIG. 10B, the application identifier is equal to "ID1." However, it should be understood that typically an application identifier is longer than three characters.

Flow moves from block 920 to block 925, where that message digest is divided into a number of segments (the number of segments either being a user selected setting or a setting that cannot be changed by a user). With reference to FIG. 10, the message digest 1030 is input into the message segmenter 1035, along with the number of segments (K) of the message digest will be extracted. In the example illustrated in FIG. 10B, the number of segments equals three. The message segmenter 1035 segments the message digest into the number of segments 1040.

Flow moves from block 925 to block 930 where the values of each of those segments is calculated. With reference to FIG. 10B, the value calculator calculates the value of each of the number of segments 1040 to generate the number of values 1050. In the example illustrated in FIG. 10B, the values for the three segments are 2, 7, and 13. These values indicate a bit position in the probabilistic representation of a notification message preference list 1060.

Flow moves from block 930 to block 935, where the bits of the probabilistic representation of that notification message preference list (blacklist or whitelist) that correspond with the calculated values are set. With reference to FIG. 10B, the set bit module 1055 sets the bits of the probabilistic representation of a notification message preference list 1060 according to the calculated values. As illustrated in FIG. 10B, corresponding with the calculated values 2, 7, and 13, the bit at index 2, 7, and 13 of the list 1060 has been set to 1. As described above, the operations of blocks 920-935 are repeated for each application identifier on the whitelist and each application identifier on the blacklist.

Flow moves from block 935 to block 940, where the generated probabilistic representations are stored and transmitted to the courier 115A (and including a random number if used). In some embodiments of the invention, the hash properties (e.g., an indication of the hash algorithm, the number of segments used, etc.) are also transmitted to the courier 115A.

Figure 11A:
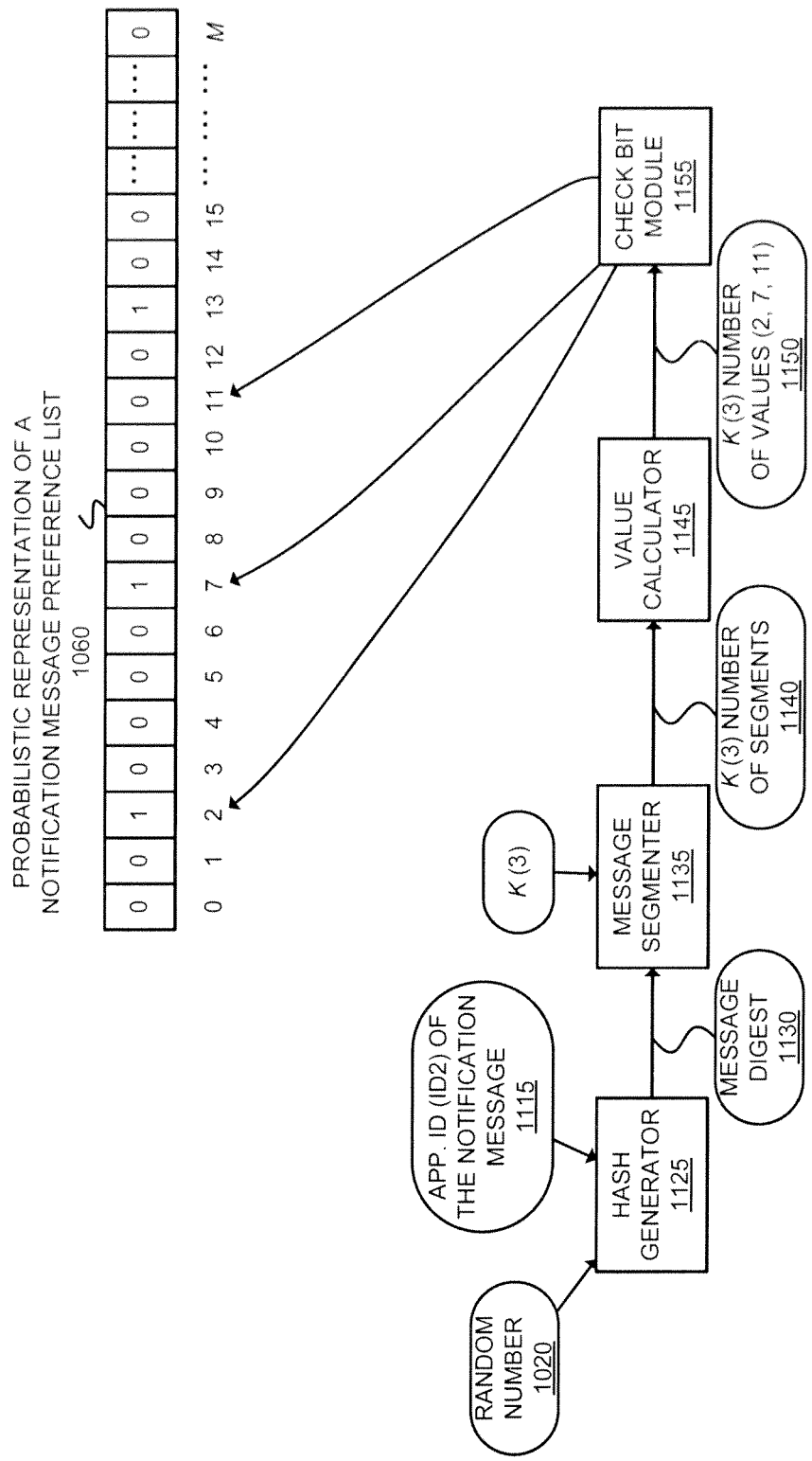
FIG. 11A illustrates determining that a probabilistic representation of a notification message preference list does not include a representation of an application identifier according to one embodiment of the invention.
Figure 11B:
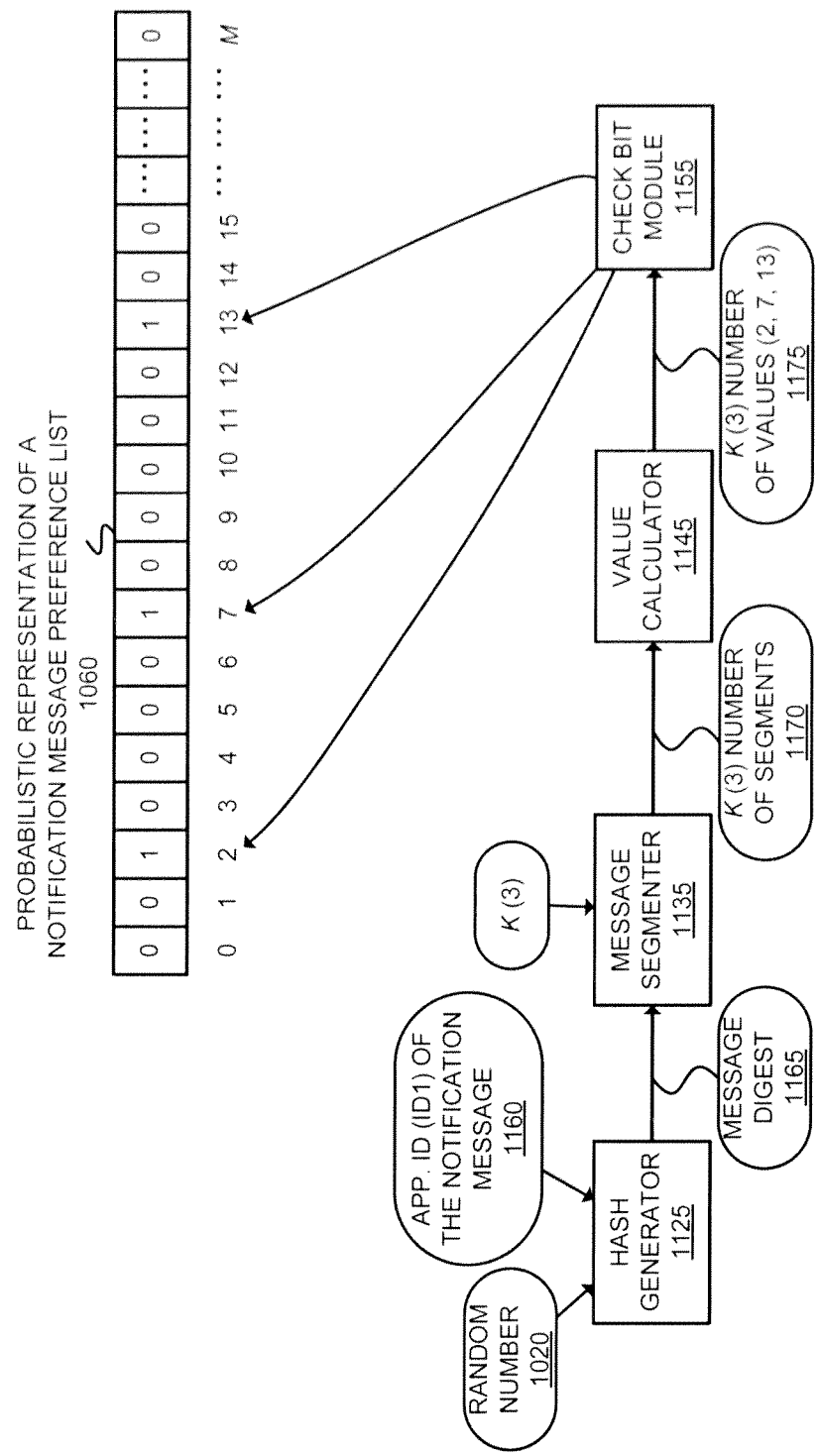
FIG. 11B illustrates determining that a probabilistic representation of a notification message preference list includes a presentation of an application identifier according to one embodiment of the invention.

Flow moves from block 940 to block 945, where the courier 115A receives the probabilistic representations from the mobile device 110A and stores them in memory (e.g., in the probabilistic representation data storage 345). Flow moves from block 945 to block 950 where the courier 115A receives a notification message for the mobile device 110A from one of the application servers 120A-120N. The notification message is parsed to determine the application identifier in the notification message. With reference to FIG. 11A, which illustrates an application identifier that is not represented on a probabilistic representation of a notification message preference list, the notification message includes the application identifier "ID2" 1115. With reference to FIG. 11B, which illustrates an application identifier that is represented on a probabilistic representation of a notification message preference list, the notification message includes the application identifier "101" 1160. Flow moves from block 950 to block 955.

At block 955, the application identifier in the notification message is hashed using the same hashing algorithm that the mobile device 110A used during the generation of the probabilistic representations of the whitelist and blacklist which generates a message digest. If the mobile device 110A transmitted a random number along with the probabilistic representations, the random number is added (e.g., prepended to the application identifier, appended to the application identifier, etc.) to the application identifier and that combination is hashed using the same hashing algorithm that the mobile device 110A used during the generation of the probabilistic representations. A default hashing algorithm (one that the mobile devices 110A-110N and the couriers 115A-115N each support and are programmed to use) will be used unless the courier 115A receives from the mobile device 110A an indication of a different hashing algorithm along with the probabilistic representations (then the hashing algorithm as indicated (if supported) will be used to generate the message digest). With reference to FIG. 11A, the hash generator 1125 hashes the combination of the random number 1020 (the same random number used in the generation of the probabilistic representation of a notification message preference list 1060) and the application identifier included in the notification message ("ID2") 1115 which generates the message digest 1130. With reference to FIG. 11B, the hash generator 1125 hases the combination of the random number 1020 and the application identifier included in the notification message ("ID1") 1160 which generates the message digest 1130. Flow moves from block 955 to block 960.

At block 960, the message digest is divided into the same number of segments (and in the same way) as the message digest(s) were divided during generation of the probabilistic representations of the whitelist and the blacklist. A default number of segments (the number being programmed on the mobile devices 110A-110N and the couriers 115A-115N) will be used unless the courier 115A receives from the mobile device 110A a different number. With reference to FIG. 11A, the message segmenter 1135 divides the message digest 1130 into three number of segments 1140 in the same way that the message segmenter 1035 divided the message digest 1030 in FIG. 10B. With reference to FIG. 11B, the message segmenter 1135 divides the message digest 1165 into three number of segments 1170. Flow moves from block 960 to block 965.

At block 965, the value for each of the number of segments is calculated. With reference to FIG. 11A, the value calculator 1145 calculates the values of each of the three segments 1140 and produces a number of values 1150 (2, 7, and 11 respectively). With reference to FIG. 11B, the value calculator 1145 calculates the values of each of the three segments 1170 which produces a number of values 1175 (2, 7, and 13 respectively). The calculated values will be used to check whether the application identifier included in the notification message is represented on the probabilistic representation of the whitelist or is on the probabilistic representation of the blacklist (or is on neither). Flow moves from block 965 to block 970.

At block 970, each of the calculated values is compared with a corresponding bit index in the probabilistic representation of the whitelist. If each of those corresponding bits is set (e.g., each are set to 1), then flow moves to block 975. If any one of those corresponding bits is not set, then flow moves to block 985. With reference to FIG. 11A, the check bit module 1155 checks the bit index of the probabilistic representation of a notification message preference list 1060 that correspond with the values 2, 7, and 11. Thus, the check bit module 1155 checks the bits that correspond with the values 2, 7, and 11. As illustrated in FIG. 11A, the bits that correspond with the values 2 and 7 are set to 1, but the bit that corresponds with the value 11 is set to 0. Thus in the example of FIG. 11A, the application identifier "ID2" in the notification message is not represented in the probabilistic representation of the notification message preference list 1060, With reference to FIG. 11B, the check bit module 1155 checks the bits that correspond with the number of values 1175 (2, 7, and 13) on the probabilistic representation of a notification message preference list 1160. As illustrated in FIG. 11B, the bits that correspond with the values 2, 7, and 13 are each set to 1. Thus, in the example of FIG. 11B, the application identifier "ID1" in the notification message is represented in the probabilistic representation of the notification message preference list 1060.

At block 975, since the application identifier included in the notification message is represented on the probabilistic representation of the whitelist for the mobile device 110A, the courier 115A transmits that notification message to the mobile device 110A. Flow moves from block 975 to block 980, where the mobile device 110A receives and processes the notification message.

Once a mobile device (e.g., the mobile device 110A) receives a notification message, the mobile device determines which application belongs to the notification message and will deliver that notification message to the application if the application is running. If an application is not currently running when the mobile device receives a notification message for that application, according to one embodiment of the invention the notification message is stored on the mobile device and will be delivered to the application after that application is executed. In another embodiment of the invention, after receiving a notification message for an application that is not currently running, the mobile device displays an alarm giving the user an option to run (execute) the corresponding application or dismiss the dialog.

While using probabilistic representations of the whitelist (and the blacklist) reduces the size of the list that must be transmitted by the mobile devices and stored by the couriers, there is a chance of a false positive (there is no chance of a false negative). If a false positive on the probabilistic representation of the whitelist has caused the courier 115A to deliver a notification message to the mobile device 110A for an application that has a preference of not receiving messages or is not installed on the mobile device 110A, the mobile device 110A will drop the notification message. The mobile device 110A may also take further actions (e.g., reporting to the courier 115A to stop sending notification messages for that application, triggering the recreation of the probabilistic representation of the whitelist that uses a different random number, etc.).

The risk of a false positive is dependent on the number of application identifiers on a probabilistic representation of a notification message preference list, the size of the probabilistic representation of that notification message preference list, and the number of segments that the message digest is split into. As described above, given a size of a probabilistic representation of a list being 4096 bits, 256 application identifiers represented on the list, five number of segments, and using the SHA-1 hashing algorithm, the risk of a false positive on the list is 0.00139. Of course, if the number of application identifiers increase, the size of the probabilistic representation may also be increased.

At block 985, since the application identifier included the notification message was not represented on the probabilistic representation of the whitelist for the mobile device 110A, the courier 115A determines whether that application identifier is included on the probabilistic representation of the blacklist. The courier 115A checks the bits of the probabilistic representation of the blacklist in a similar way as it checked the bits of the probabilistic representation of the whitelist (e.g., it checks if each of the calculated value corresponds with a set bit in the probabilistic representation of the blacklist). If each bit does correspond with a set bit (thus the application identifier is represented on the probabilistic representation of the blacklist), then flow moves to block 990. If any of the bits does not correspond with a set bit (thus the application identifier is not represented on the probabilistic representation of the blacklist), then flow moves to block 995.

At block 990, since the application identifier of the notification message is represented on the probabilistic representation of the blacklist for the mobile device 110A, the courier 115A does not transmit the application identifier to the mobile device 110A and drops the notification message. Similarly as described with reference to the probabilistic representation of the whitelist, there is a small chance that there is a false positive on the probabilistic representation of the blacklist.

At block 995, since the application identifier of the notification message is not represented on the probabilistic representation of the blacklist (nor the probabilistic representation of the whitelist) (thus the application corresponding to that application identifier is not installed on the mobile device 110A), the courier 115A reports to the application server that sent the notification message that the application is not installed on the mobile device 110A and to stop sending notification messages for that application to the mobile device 110A.

Thus, in one embodiment of the invention, each of the mobile devices 110A-110N maintain a whitelist and blacklist and transmits representations of the whitelist and blacklist (including uncompressed application identifiers) to ones of the couriers 115A-115N it currently has an established connection with. The couriers 115A-115N use the representations of the whitelist and blacklist when determining how to process notification messages it receives from the application servers 120A-120N (e.g., deliver to the mobile devices 110A-110N, drop, report back to the application servers 120A-120N of an uninstalled application). Thus, without potentially waking a mobile device, a courier will not deliver notification messages to that mobile device for applications not represented on the whitelist.

In another embodiment of the invention, each of the mobile devices 110A-110N maintains a whitelist and blacklist, compresses those lists, and transmits the compressed lists to ones of the couriers 115A-115N it currently has an established connection with. A compressed whitelist and a compressed blacklist is smaller in size than the corresponding uncompressed whitelist and uncompressed blacklist. The couriers 115A-115N decompress the whitelists and blacklists, and use them when determining how to process notification messages. Thus, in addition to not delivering notification messages to that mobile device for applications not represented on the whitelist, the compressed representation of the whitelists and blacklists consumes less bandwidth and takes less time to transmit than transmitting representations of the whitelist and blacklist that include uncompressed application identifiers.

In another embodiment of the invention, each of the mobile devices 110A-110N maintains a whitelist and a blacklist, creates a probabilistic representation of the whitelist and a probabilistic representation of the blacklist, and transmits the probabilistic representations to ones of the couriers 115A-115N it currently has an established connection with. A probabilistic representation of a whitelist and a probabilistic representation of a blacklist is smaller in size than the corresponding whitelist and blacklist, and a corresponding compressed versions of the whitelist and blacklist. Thus, in addition to not delivering notification messages to that mobile device for applications not represented on the whitelist, the probabilistic representations of the whitelist and blacklist consumes less bandwidth and lakes less time to transmit than transmitting representations of the whitelist and blacklist that include uncompressed application identifiers or compressed representations of the whitelist and blacklist.

Figure 12:
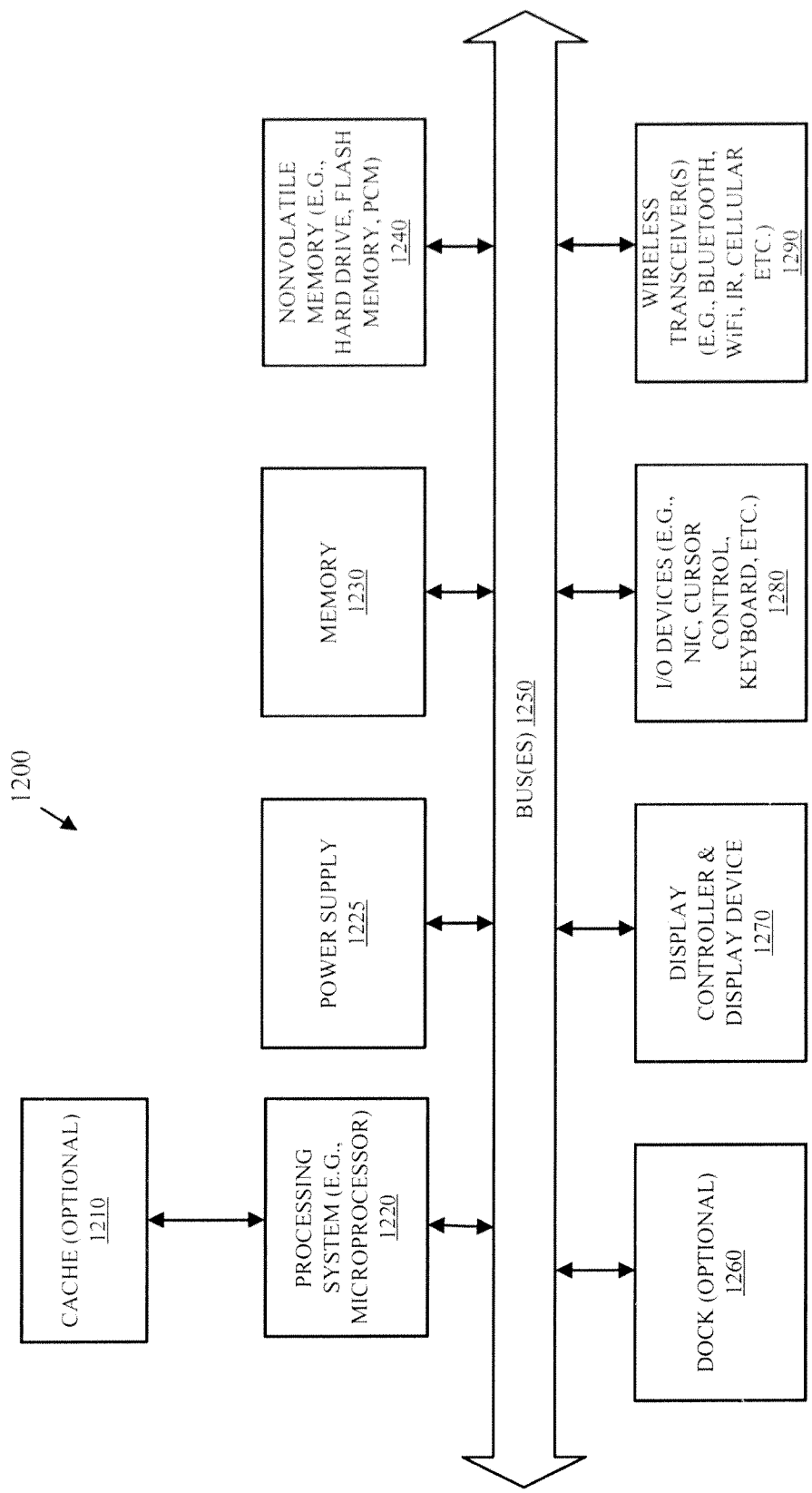
FIG. 12 is a block diagram illustrating an exemplary architecture of a mobile device which may be used in some embodiments of the invention.

FIG. 12 is a block diagram illustrating an exemplary architecture of a mobile device which may be used in some embodiments of the invention. For example, the exemplary architecture of the mobile device 1200 may be included in the mobile device 110A. It should be understood that while FIG. 12 illustrates various components of a computing system, it is not intended to represent any particular architecture or manner of interconnecting the components as such details are not germane to the present invention. It will be appreciated that other mobile devices that have fewer components or more components may also be used with the present invention.

As illustrated in FIG. 12, the mobile device 1200, which is a form of a data processing system, includes the bus(es) 1250 which is coupled with the processing system 1220, power supply 1225, memory 1230, and the nonvolatile memory 1240 (e.g., a hard drive. Hash memory, Phase-Change Memory (PCM), etc.). The bus(es) 1250 may be connected to each other through various bridges, controllers, and/or adapters as is well known in the art. The processing system 1220 may retrieve instruction(s) from the memory 1230 and/or the nonvolatile memory 1240. and execute the instructions to perform operations as described above. The bus 1250 interconnects the above components together and also interconnects those components to the optional dock 1260, the display controller & display device 1270, Input/Output devices 1280 (e.g., NIC (Network Interface Card), a cursor control (e.g., mouse, touchscreen, touchpad, etc.), a keyboard, etc.), and the wireless transceiver(s) 1290 (e.g., Bluetooth, Wifi, Infrared, wireless cellular telephony transceiver, etc.).

While embodiments of the invention have been described with reference to a compacted representation of a whitelist and a compacted representation of a blacklist for each mobile device, in alternative embodiments of the invention the mobile devices may generate a set of compacted representations (whitelist and blacklist) to be used during active mode (non-sleep mode) and a different set of compacted representations (whitelist and blacklist) to be used during sleep mode. For example, since a mobile device must be wakened in order to process a notification message, and the battery life of the mobile device is drained each time the mobile device is wakened, users of the mobile device may want to receive notification messages for certain applications during active mode and only a certain subset of those applications during sleep mode. In this embodiment, a mobile device generates and transmits four compacted representations to a courier. Since a courier will not know if the mobile device is in active mode or sleep mode (the connections will be maintained during sleep mode), prior to entering into sleep mode the mobile device may transmit a message to the courier indicating that it is going into sleep mode, While embodiments of the invention have been described with reference to the mobile devices generating a compacted representation of a whitelist and a compacted representation of a blacklist, in an alternative embodiment of the invention the mobile devices only generate and transmit to the couriers a compacted representation of a whitelist. For example, since the couriers use the compacted representation of the blacklist to primarily determine if an application is installed on a particular mobile device and it does not affect whether the couriers deliver the notification messages to the mobile devices, the representation of the blacklist may not be necessary. However, use of compacted representations of blacklists may reduce the amount of traffic in the network since the couriers will be able to report to the application servers to stop transmitting notification messages for uninstalled applications.

While embodiments of the invention have been described with reference to dropping notification messages that include application identifiers that are represented on the compacted representation of the blacklist for a given mobile device, in alternative embodiments of the invention those notification messages are stored and transmitted to that mobile device concurrently with a notification message that includes an application identifier that is represented on the compacted representation of the whitelist. For example, since the courier transmits a notification message (and thus potentially waking up the mobile device) if the application identifier included in that notification message is represented on the compacted representation of the whitelist, the mobile device may also receive the notification messages that have been stored for those applications on its blacklist.

While embodiments of the invention have been described with reference to two separate lists (a whitelist and a blacklist), in one embodiment of the invention there is only a single data structure that stores the notification message preference for each application. The compacted representations (one for those applications that receive notification messages and one for those applications that do not receive notification messages) may be generated from the single data structure.

In some embodiments of the invention, a given mobile device may have multiple users and/or multiple accounts each with its own set of notification message preference lists (whitelist and blacklist). All of these lists may be transmitted to the couriers. In these embodiments of the invention, the notification message received from the application servers further includes a user identifier (e.g., username that is unique on a given mobile device).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A mobile device, comprising:
   a processor to execute instructions; and
   a memory coupled with the processor, the memory having instructions that, when executed, cause the processor to perform operations including:
   maintaining one of a whitelist or a blacklist;
   wherein the whitelist represents one or more of a plurality of applications installed on the mobile device that may receive notification messages from a courier coupled to the mobile device, wherein the whitelist includes one or more application identifiers for each of the one or more of the plurality of applications respectively;
   wherein the blacklist represents another one of the plurality of applications installed on the mobile device that may not receive notification messages from the courier, wherein the blacklist includes one or more application identifiers for the another one of the plurality of applications respectively; and
   transmitting a representation of one of the whitelist or the blacklist to the courier that controls the transmission of notification messages to the mobile device, wherein the courier uses the representation to determine whether to forward notification messages received by the courier from a plurality of application servers and the received notification messages are directed to the mobile device.

2. The mobile device of claim 1, wherein the representation of the whitelist and the blacklist includes uncompressed application identifiers of the whitelist and blacklist.

3. The mobile device of claim 1, wherein the blacklist includes one or more application identifiers corresponding with the another one of the plurality of applications that are not currently running on the mobile device.

4. The mobile device of claim 1, wherein the blacklist includes one or more application identifiers corresponding with the another one of the plurality of applications that have been disabled by a user of the mobile device.

5. The mobile device of claim 1, wherein the blacklist includes one or more application identifiers corresponding with the another one of the plurality of applications that a user has selected not to receive notification messages for.

6. The mobile device of claim 1, further comprising one or more instructions that, when executed, cause the processor to perform operations including:
   responsive to the mobile device moving to a different courier, transmitting the representation of one of the whitelist or the blacklist to the different courier.

7. The mobile device of claim 1, wherein the representation of the whitelist and the representation of the blacklist are compacted representations.

8. The mobile device of claim 7, wherein the compacted representations of the whitelist and blacklist are probabilistic representations, and wherein the memory further stores one or more instructions, which when executed, cause the processor to perform the following operations:
   creating the probabilistic representation of the whitelist, wherein the size of the probabilistic representation of the whitelist is smaller than the size of the whitelist; and
   creating a probabilistic representation of the blacklist, wherein the size of the probabilistic representation of the blacklist is smaller than the size of the blacklist.

9. The mobile device of claim 8,
   wherein creating the probabilistic representation of the whitelist includes for each application identifier on the whitelist, hashing that application identifier to generate a hashed application identifier and setting those bits of the probabilistic representation of the whitelist that correspond with the hashed application identifier, and wherein creating the probabilistic representation of the blacklist includes for each application identifier on the blacklist, hashing that application identifier to generate a hashed application identifier and setting those bits of the probabilistic representation of the blacklist list that correspond with the hashed application identifier.

10. The mobile device of claim 9, wherein each hashed application identifier is generated from a SHA-1 hash of the corresponding application identifier, and wherein the memory further stores one or more instructions, which when executed, cause the processor to perform the following operations:

for each hashed application identifier generated from a corresponding application identifier on the whitelist, performing the following:
dividing that hashed application identifier into a number of segments,
calculating a value for each of the number of segments, and
setting those bits of the probabilistic representation of the whitelist that correspond with the calculated values;
for each hashed application identifier generated from a corresponding application identifier on the blacklist, performing the following:
dividing that hashed application identifier into a number of segments,
calculating a value for each of the number of segments, and
setting those bits of the probabilistic representation of the blacklist that correspond with the calculated values; and
storing the probabilistic representations of the whitelist and the blacklist on the mobile device.

11. The mobile device of claim 9, wherein the memory further stores one or more instructions, which when executed, cause the processor to perform the following operations:

prior to hashing the application identifiers on the whitelist and the blacklist, salting the application identifiers on the whitelist by adding a same random number to each of those application identifiers, and salting the application identifiers on the blacklist by adding a same random number to each application identifier of those application identifiers; and
transmitting those random numbers to the one or more couriers.

12. The mobile device of claim 9, wherein the memory further stores one or more instructions, which when executed, cause the processor to perform the following operations:

responsive to an application identifier being added to, or removed from, the whitelist, performing the following:
clearing those bits set in the probabilistic representation of the whitelist,
for each application identifier on the whitelist, performing the following:
salting that application identifier with a same random number used for each application identifier on the whitelist,
hashing that application identifier and random number with the SHA-1 hashing algorithm,
dividing the result of the hashing into a number of segments,
calculating a value for each of the number of segments, and
setting those bits of the probabilistic representation of the whitelist that correspond with the calculated values;
storing the probabilistic representation of the whitelist on the mobile device; and
transmitting the probabilistic representation of the whitelist to the one or more couriers.

13. The mobile device of claim 9, wherein the memory further stores one or more instructions, which when executed, cause the processor to perform the following operations:

responsive to an application identifier being added to, or removed from, the blacklist, performing the following:
clearing those bits set in the probabilistic representation of the blacklist,
for each application identifier on the blacklist, performing the following:
salting that application identifier with a same random number used for each application identifier on the blacklist,
hashing that application identifier and random number with the SHA-1 hashing algorithm,
dividing the result of the hashing into a number of segments,
calculating a value for each of the number of segments, and
setting those bits of the probabilistic representation of the blacklist that correspond with the calculated values;
storing the probabilistic representation of the blacklist on the mobile device; and
transmitting the probabilistic representation of the blacklist to the one or more couriers.

14. A courier, comprising:
a processor to execute instructions; and
a memory coupled with the processor, the memory having instructions that, when executed, cause the processor to perform operations including,
receiving a representation of one of a whitelist or a blacklist from each of a plurality of mobile devices that were generated by each of the plurality of mobile devices, wherein the whitelist represents one or more of a plurality of applications installed on the mobile device that may receive notification messages and the blacklist that represents another one of the plurality of applications installed on the mobile device that may not receive notification messages;
storing the received representations for each mobile device;
receiving notification messages for different ones of the plurality of mobile devices, each notification message including an application identifier, wherein the notification messages are received from a plurality of application servers; and
for each received notification message, performing the following:
determining which one of the plurality of mobile devices the notification is for, and
determining whether to transmit that notification message to the determined one of the plurality of mobile devices based on the representation of the whitelist or the blacklist received from that mobile device.

15. The courier of claim 14, wherein at least some of the representations of the whitelists and the blacklists include uncompressed application identifiers.

16. The courier of claim 14, wherein the representation of the blacklists received from a given one of the mobile devices includes one or more application identifiers corresponding with the another one of the plurality of applications that are not currently running on that given one of the mobile devices.

17. The courier of claim 14, wherein the representation of the blacklists received from a given one of the mobile devices includes one or more application identifiers corresponding with the another one of the plurality of applications that have been disabled by a user of that given one of the mobile devices.

18. The courier of claim 14, wherein the representation of the blacklists received from a given one of the mobile devices includes one or more application identifiers corresponding with the another one of the plurality of applications that a user of that given one of the mobile devices has selected not to receive notification messages for.

19. The courier of claim 14, wherein the representation of the whitelist and the representation of the blacklist are compacted representations.

20. The courier of claim 19, wherein the compacted representations of the whitelist and blacklist are probabilistic representations.

21. The courier of claim 20, wherein determining whether to transmit that notification message further comprises:

hashing the application identifier included in the received notification message;

dividing the hashing result into a number of segments;

calculating a value for each of the number of segments;

determining whether each value corresponds with a set bit in the probabilistic representation of the whitelist;

if each calculated value corresponds with a set bit in the probabilistic representation of the whitelist, transmitting the notification message to the determined one of the mobile devices, and if each calculated value corresponds with a set bit in the in the probabilistic representation of the blacklist, do not transmit the notification message.

22. The courier of claim 21, wherein the memory further stores one or more instructions, which when executed, cause the processor to perform the following operations:

for each received notification message, if any of the calculated values do not correspond with a set bit in the probabilistic representation of the whitelist or the blacklist, notifying that the application is uninstalled on that mobile device to the sender of that notification message.

23. The courier of claim 21, wherein the memory further stores one or more instructions, which when executed, cause the processor to perform the following operations:

if each calculated value corresponds with a set bit in the probabilistic representation of the blacklist, dropping that notification message.

* * * * *